US010696264B2

United States Patent
Suemitsu et al.

(10) Patent No.: US 10,696,264 B2
(45) Date of Patent: Jun. 30, 2020

(54) AIRBAG AND METHOD OF PRODUCTION OF AIRBAG

(71) Applicants: TOYODA GOSEI CO., LTD., Kiyosu-shi, Aichi-ken (JP); SEIREN CO., LTD., Fukui-shi, Fukui-ken (JP)

(72) Inventors: Taizo Suemitsu, Kiyosu (JP); Takayuki Umeyama, Kiyosu (JP); Mikifusa Matsunaga, Fukui (JP)

(73) Assignees: TOYODA GOSEI CO., LTD., Aichi-pref. (JP); SEIREN CO., LTD., Fukui-shi (JP)

( * ) Notice: Subject to any disclaimer, the term of this patent is extended or adjusted under 35 U.S.C. 154(b) by 149 days.

(21) Appl. No.: 16/077,763

(22) PCT Filed: Feb. 13, 2017

(86) PCT No.: PCT/JP2017/005083
§ 371 (c)(1),
(2) Date: Aug. 14, 2018

(87) PCT Pub. No.: WO2017/141857
PCT Pub. Date: Aug. 24, 2017

(65) Prior Publication Data
US 2019/0054889 A1 Feb. 21, 2019

(30) Foreign Application Priority Data

Feb. 18, 2016 (JP) .................. 2016-029346

(51) Int. Cl.
*B60R 21/231* (2011.01)
*B60R 21/2338* (2011.01)
(Continued)

(52) U.S. Cl.
CPC ........ *B60R 21/231* (2013.01); *B60R 21/2338* (2013.01); *B60R 21/36* (2013.01);
(Continued)

(58) Field of Classification Search
CPC ... B60R 21/231; B60R 21/36; B60R 21/2338; B60R 21/235; B60R 2021/23382;
(Continued)

(56) References Cited

U.S. PATENT DOCUMENTS 5,482,317 A * 1/1996 Nelsen .................. B60R 21/231
280/743.1
6,749,220 B1 * 6/2004 Wipasuramonton ..........................
B60R 21/235
280/728.1

(Continued)

FOREIGN PATENT DOCUMENTS

| EP | 2 127 961 A1 | 12/2009 |
| JP | 2001-097156 A | 4/2001 |
| JP | 2008-230291 A | 10/2008 |
| JP | 2009-056830 A | 3/2009 |

OTHER PUBLICATIONS

International Search Report of the International Searching Authority dated Apr. 4, 2017 for the corresponding International application No. PCT/JP2017/005083 (and English translation).

*Primary Examiner* — Keith J Frisby
(74) *Attorney, Agent, or Firm* — Posz Law Group, PLC

(57) ABSTRACT

Provided is an airbag which can be easily manufactured though it is provided with a tether inside, and has a reduced fear of gas leakage from a joint region. The airbag includes a joint region of outer circumferential edges of a pair of walls. The joint region includes, between the outer circumferential edges of the pair of walls, a sealing member which has elasticity, and has adhesiveness in an unsolidified state. The joint region is formed by such a sewing that runs a sewing thread through an application area of the sealing member. A tether connects the pair of walls. The joint region includes a region in which the sealing member has a solidified, thus non-adhesive surface, and is pressed against (Continued)

at least one of the walls by the non-adhesive surface, and penetrated by the sewing thread in that state.

12 Claims, 17 Drawing Sheets

(51) Int. Cl.
    *B60R 21/36*     (2011.01)
    *B60R 21/235*     (2006.01)
    *B29L 22/02*     (2006.01)

(52) U.S. Cl.
    CPC ............ *B29L 2022/027* (2013.01); *B60R 2021/23382* (2013.01); *B60R 2021/23538* (2013.01); *B60R 2021/23561* (2013.01); *B60R 2021/23576* (2013.01); *B60R 2021/23595* (2013.01)

(58) Field of Classification Search
    CPC .. B60R 2021/23595; B60R 2021/2358; B60R 2021/23576; B60R 2021/23538; B60R 2021/23561; B29L 2022/027
    USPC ................................ 280/743.2, 743.1, 728.1
    See application file for complete search history.

(56) References Cited

U.S. PATENT DOCUMENTS

| | | | |
|---|---|---|---|
| 7,789,417 B2* | 9/2010 | Yoshikawa | B60N 2/42763 280/730.1 |
| 2002/0020992 A1* | 2/2002 | Kanuma | B60R 21/232 280/730.2 |
| 2004/0029468 A1* | 2/2004 | Kim | B32B 27/12 442/76 |
| 2005/0098991 A1 | 5/2005 | Nagai et al. | |
| 2006/0138748 A1* | 6/2006 | Kino | B60R 21/232 280/728.1 |
| 2006/0205302 A1* | 9/2006 | Woydick | B29C 66/1122 442/76 |
| 2008/0265552 A1 | 10/2008 | Nagai et al. | |
| 2009/0179409 A1* | 7/2009 | Hill | B60R 21/235 280/743.1 |
| 2010/0078919 A1* | 4/2010 | Naruse | B60R 21/235 280/728.2 |
| 2010/0320736 A1* | 12/2010 | Traber | B60R 21/235 280/743.1 |
| 2011/0057425 A1* | 3/2011 | Fink | B60R 21/232 280/730.2 |
| 2011/0115203 A1* | 5/2011 | Teshima | B60R 21/235 280/743.1 |
| 2012/0161425 A1* | 6/2012 | Kino | B60R 21/207 280/730.1 |

\* cited by examiner

A.

B.

A.

B.

AIRBAG AND METHOD OF PRODUCTION OF AIRBAG

CROSS REFERENCE TO RELATED APPLICATIONS

This application is a U.S. national phase of International Application No. PCT/JP2017/005083 filed on Feb. 13, 2017, and is based on Japanese Patent Application No. 2016-029346 filed on Feb. 18, 2016, the contents of which are incorporated herein by reference.

TECHNICAL FIELD

The present invention relates to an airbag which is inflatable with an inflation gas by separating a pair of opposing walls, and also relates to a method of production of the airbag.

BACKGROUND ART

As disclosed in the Patent Document 1, by way of example, a known airbag includes a joint region that joins outer circumferential edges of a pair of walls together. The joint region is formed by placing a sealing member, which has elasticity and has adhesiveness in an unsolidified state, between the outer circumferential edges of the pair of walls, and sewing the outer circumferential edges together with sewing threads such that the threads penetrate an application area of the sealing member.

The sealing member is used for the purpose of preventing gas leakage from the joint region at airbag deployment. Generally, a main cause of gas leakage of an airbag at deployment is a gas leakage from holes which are formed by stitching the walls with sewing threads (i.e. from gaps formed between the sewing threads and the walls). In the above known airbag, the sealing member is applied to the outer circumferential edge of one of the wall, the other wall is then laid over the former before the sealing member is solidified, and then the outer circumferential edges of the pair of walls are joined together by running the sewing threads through the application area of the sealing member. In this conventional airbag, since the sealing member having elasticity is adhered to both of the walls and stops a space between the walls, it covers the sewing threads in the space all over. That is, the sealing member stops the gaps formed between the sewing threads and the walls of the airbag (i.e. the holes formed by stitching the walls with the sewing threads), thus preventing a gas leakage from the gaps formed between the sewing threads and the walls of the airbag.

PRIOR ART DOCUMENTS

Patent Documents

Patent Document 1: JP2008-230291A

SUMMARY OF INVENTION

Technical Problem

An airbag configured as described above may be provided with a tether that connects the pair of walls inside the airbag in order to limit a clearance between the walls at airbag deployment. Such a tether must be mounted on the airbag before the application of the sealing member. When the sealing member is applied to the airbag as provided with the tether, the work has to be conducted by turning up one of the walls and separating the same from the other wall little by little while paying a special attention to keep the tether away from the sealing member. This has complicated the application work of the sealing member, and a simplification of the production has been demanded. Moreover, in the airbag configured as described above, when an application area of the sealing member is disposed proximate to the tether, a portion of the sealing member proximate the tether is likely to become bulky.

The present invention has been contemplated to solve the above-described problems, and aims to provide an airbag which can be easily manufactured though it is provided with a tether inside, and has a reduced fear of gas leakage from the joint region of the walls. The invention also aims to provide a method of production of such an airbag.

Solution to Problem

The airbag of the invention is designed to be inflated with an inflation gas by separating a pair of opposing walls. The airbag includes a joint region of outer circumferential edges of the pair of walls. The joint region includes, between the outer circumferential edges of the pair of walls, a sealing member which has elasticity, and has adhesiveness in an unsolidified state. The joint region is formed by such a sewing that runs a sewing thread through an application area of the sealing member. The airbag is further provided with a tether that connects the pair of walls to limit a clearance between the walls at airbag deployment. The joint region includes a region in which the sealing member has a solidified, thus non-adhesive surface, and is pressed against at least one of the walls by the non-adhesive surface, and penetrated by the sewing thread in that state.

In the airbag of the invention, the sealing member of the joint region is configured such that the solidified, thus non-adhesive surface is pressed against the one of the pair of walls. With this configuration, the joint region can be formed by preparing the sealing member in advance, connecting the tether, then placing the sealing member between the outer circumferential edges of the pair of walls, and by sewing up the outer circumferential edges. Moreover, in the airbag of the invention, the joint region includes the sealing member. Although the sealing member is not adhered to at least the one of the pair of walls, its solidified, thus non-adhesive surface is pressed against the one of the pair of walls. With this configuration, in the one of the walls which the sealing member is pressed against, the sealing member is pressed against and thus closes off holes which are formed on the wall by penetration of the sewing threads (i.e. gaps formed between the wall and sewing threads), thereby preventing a gas leakage from the gaps, i.e. from the joint region, at airbag deployment.

Therefore, the airbag of the invention can be easily manufactured though it is internally provided with the tether, and has a reduced fear of gas leakage from the joint region.

In the airbag of the invention, if the sealing member of the joint region is adhered to the other wall of the airbag, the sealing member can be prepared in advance on the other wall. In the other wall, the sealing member covers a surrounding area of the other wall and sewing threads on the other wall without leaving any gaps, thereby preventing a gas leakage from this wall at airbag deployment, similarly to conventional airbags. As a consequence, a gas leakage from the joint region at airbag deployment will be further prevented.

In the airbag configured as described above, it is desired that: an adhesion wall, which is the other of the pair of walls to which the sealing member is adhered, includes an extended region that is disposed on an outside of the sealing member, and a second sealing member is adhered to the extended region;

an outer circumferential edge of a non-adhered wall, which is the one of the pair of walls which the non-adhesive surface of the sealing member is pressed against, is sandwiched between an application area of the sealing member on the adhesion wall and the extended region on which the second sealing member is disposed, in a state that the non-adhesive surface of the sealing member and a non-adhesive surface of the second sealing member are pressed against the outer circumferential edge of the non-adhered wall; and the outer circumferential edge of the non-adhered wall is joined to the adhesion wall by sewing running through the sealing member and second sealing member.

With the above configuration, the outer circumferential edge of the non-adhered wall is joined with the adhesion wall by such a sewing that runs the sewing threads through the sealing member and second sealing member in a state that the outer circumferential edge of the non-adhered wall is sandwiched between the sealing member and the second sealing member. Accordingly, the non-adhered wall is pressed by the non-adhesive surface of the sealing member and the non-adhesive surface of the second sealing member on both surfaces. That is, on the part of the non-adhered wall, the sealing member and the second sealing member are pressed against and stop the holes formed on the non-adhered wall by penetration of the sewing threads (i.e. the gaps formed between the non-adhered wall and sewing threads) from both sides, thus preventing gas leak from the holes further adequately. On the part of the adhesion wall, since the sealing member and second sealing member are both adhered to the adhesion wall, the sealing member and the second sealing member each covers a surrounding area of the adhesion wall and sewing threads and a surrounding area of the extended region and sewing threads without leaving any gaps, thereby preventing a gas leakage from the adhesion wall and the extended region, at airbag deployment. As a consequence, a gas leakage from non-adhered wall of the joint region will be prevented adequately, and a gas leakage from the joint region at airbag deployment will be prevented further adequately.

It is also conceivable that the sealing member is adhered to a flexible base member that corresponds in contour to the joint region of the outer circumferential edges of the pair of walls, and that the sealing member is penetrated by the sewing threads between the outer circumferential edges of the pair of walls, together with the base member.

With this configuration, a predetermined joint region can be formed by preparing a sealing member as adhered to a base member in advance, inserting the sealing member in between the pair of walls, and sewing the walls together, and a work efficiency in production of the airbag will be improved in comparison with an instance where a sealing member is applied to one of the pair of walls and solidified, and then the walls are sewn together after solidification of the sealing member.

In the airbag configured as described above, it is desired that the joint region includes:

a non-adhered joint region that includes the sealing member which is pressed against the one of the pair of walls by the non-adhesive surface; and an adhered joint region that includes a region in which the sealing member is adhered to the outer circumferential edges of both of the pair of walls and the outer circumferential edges of the walls are joined by sewing with the sewing thread.

With the above configuration, the airbag includes the adhered joint region that is excellent in sealing property. Since the adhered joint region has a good sealing property and has a limited fear of gas leakage, the combination of the non-adhered joint region and adhered joint region will further adequately prevent a gas leakage from the joint region in comparison with an instance where a whole joint region is composed of the non-adhered joint region only.

The method of production of an airbag of the invention is a method of production of the following airbag. The airbag is inflatable with an inflation gas by separating a pair of opposing walls. The airbag includes a tether that connects the pair of walls to limit a clearance between the pair of walls at airbag deployment, and a joint region of outer circumferential edges of the pair of walls. The joint region includes, between the outer circumferential edges of the pair of walls, a sealing member which has elasticity, and has adhesiveness in an unsolidified state. The joint region is formed by such a sewing that runs a sewing thread through an application area of the sealing member. The joint region includes a region in which the sealing member has a solidified, thus non-adhesive surface, and is pressed against at least one of the pair of walls by the non-adhesive surface, and penetrated by the sewing thread in that state.

The method of production includes:

applying a sealing agent to the other of the pair of walls and solidifying the sealing agent so as to form the sealing member provided with the non-adhesive surface;

mounting the tether such that the tether connects the pair of walls; and forming the joint region in which the non-adhesive surface of the sealing member is pressed against the one of the pair of walls by pressing the non-adhesive surface of the sealing member against the one of the pair of walls, and sewing the outer circumferential edges of the pair of walls together by running the sewing thread through the application area of the sealing member.

In the method of production of an airbag of the invention, the joint region is formed by preparing the sealing member in advance, connecting the tether to the pair of walls, then placing the sealing member between the outer circumferential edges of the pair of walls, and by sewing up the outer circumferential edges. The method will facilitate an application of the sealing member, and facilitates the production of the airbag.

The airbag may be produced according to the following production method.

The method is a method of production of the following airbag. The airbag is inflatable with an inflation gas by separating a pair of opposing walls. The airbag includes a tether that connects the pair of walls to limit a clearance between the pair of walls at airbag deployment, and a joint region of outer circumferential edges of the pair of walls. The joint region includes, between the outer circumferential edges of the pair of walls, a sealing member which has elasticity, and has adhesiveness in an unsolidified state. The joint region is formed by such a sewing that runs a sewing thread through an application area of the sealing member. The joint region includes a region in which the sealing member has a solidified, thus non-adhesive surface, and is pressed against at least one of the pair of walls by the non-adhesive surface, and penetrated by the sewing thread in that state. The sealing member is composed of a sealing agent that has been applied to a flexible base member that corresponds in contour to the joint region of the outer circumferential edges of the pair of walls, then solidified, such that the sealing member is provided with the non-adhesive surface.

The method of production includes:
placing the sealing member between the pair of walls after mounting the tether to connect the pair of walls; and
forming the joint region in which the non-adhesive surface of the sealing member is pressed against the one of the pair of walls by pressing the non-adhesive surface of the sealing member against the one of the pair of walls, and sewing the outer circumferential edges of the pair of walls together by running the sewing thread through an application area of the sealing member.

With this production method, a joint region can be formed by preparing a sealing member as adhered to a base member in advance, inserting the sealing member in between the pair of walls, and sewing the walls together. Moreover, a work efficiency in production of the airbag will be improved in comparison with an instance where a sealing member is applied to one of the pair of walls and solidified, and the walls are sewn together after solidification of the sealing member.

MODES FOR CARRYING OUT THE INVENTION

Figure 1:
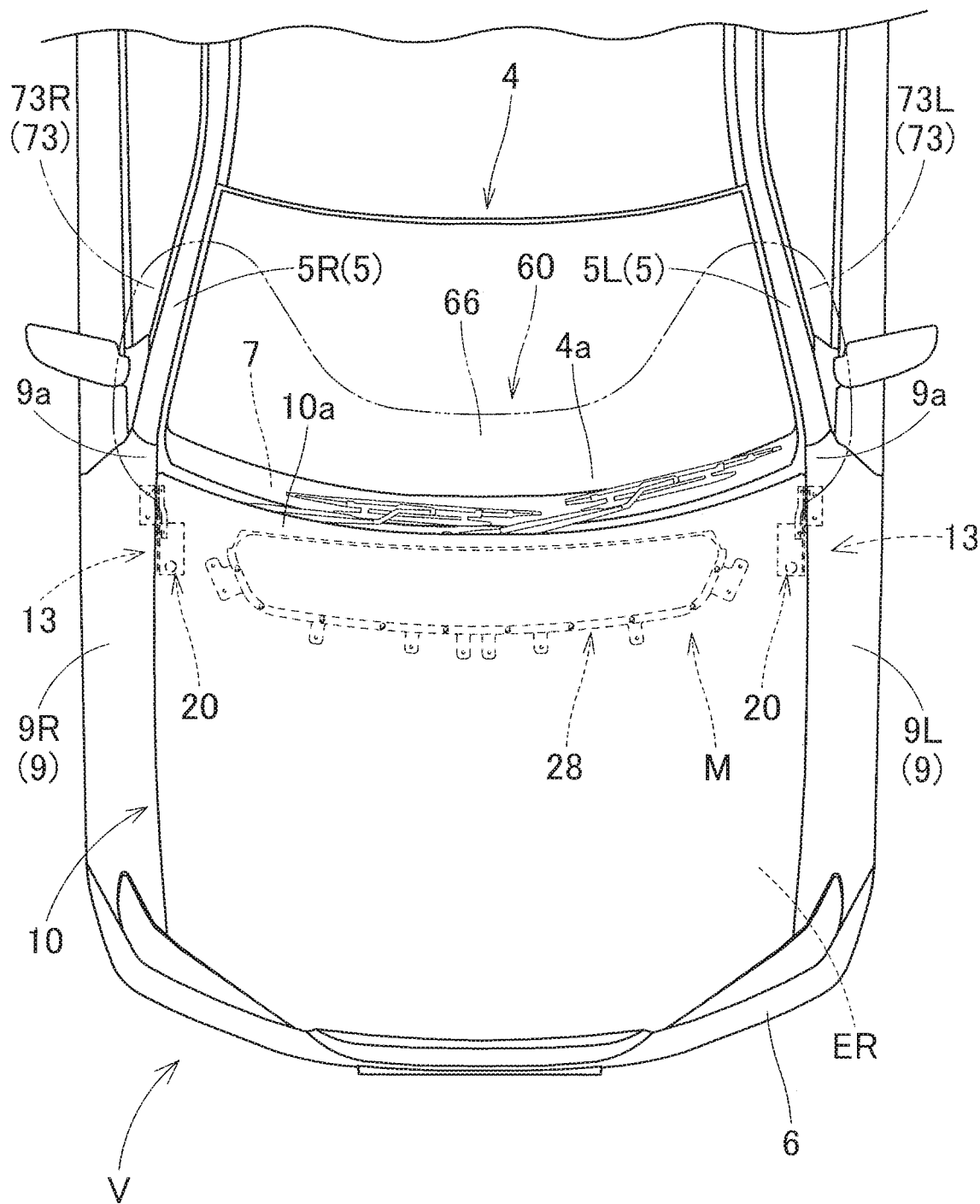
FIG. 1 is a plan view of a vehicle equipped with an airbag device for pedestrian protection which employs an airbag embodying the invention.
Figure 14:
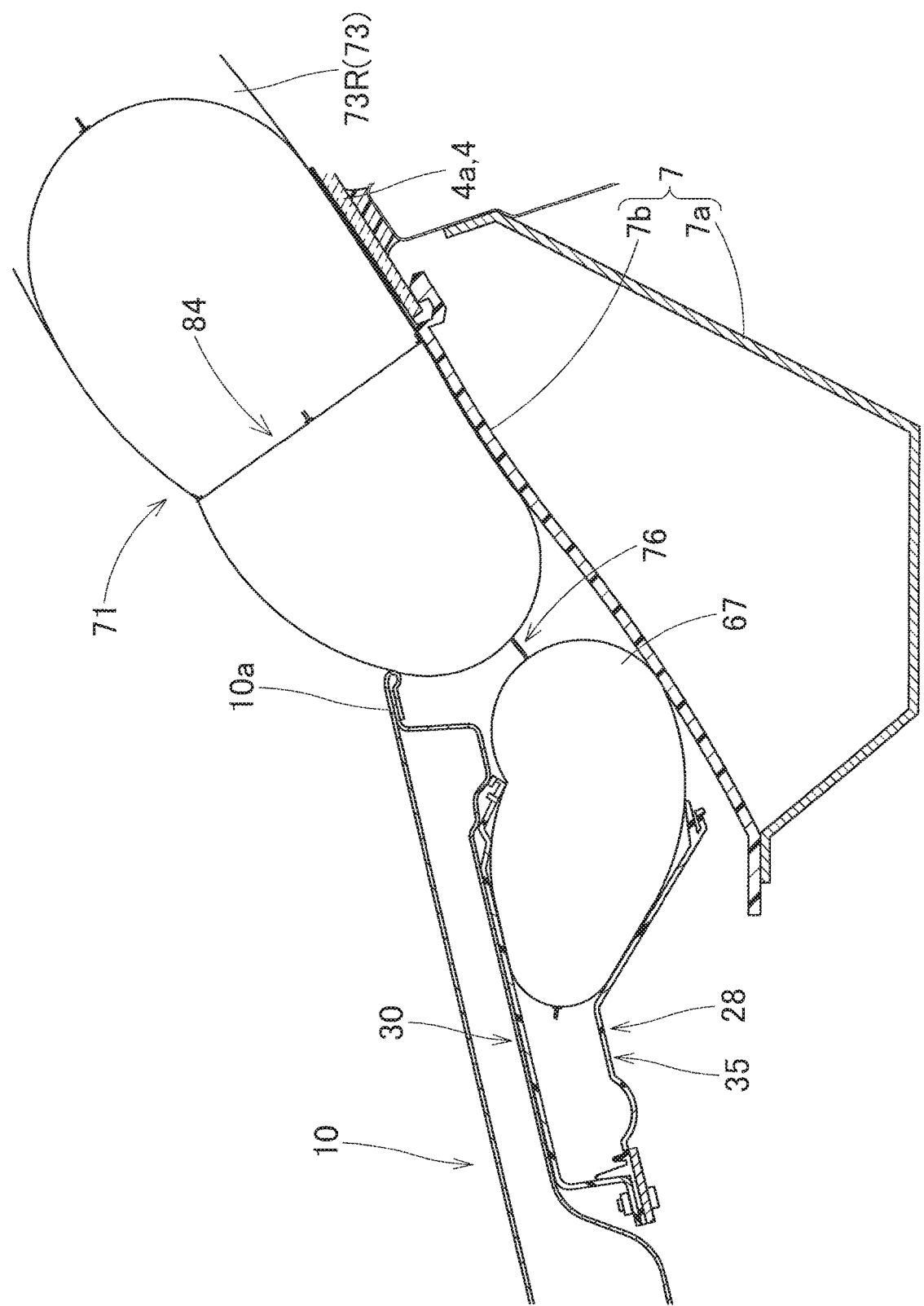
FIG. 14 is a schematic vertical sectional view of the airbag device for pedestrian protection at airbag deployment.

An embodiment of the present invention is described below with reference to the accompanying drawings. In the following description, the invention will be described as embodied into an airbag device M for pedestrian protection. The airbag device M for pedestrian protection, which will hereinafter be abbreviated to the "airbag device", is disposed in a vicinity of and on an underside of a rear end 10a of a hood 10 of a vehicle V, generally at the center in a left and right direction of the vehicle V, between left and right front pillars 5 (5L and 5R), as shown in FIGS. 1 and 14. In this embodiment, the airbag device M is designed to be actuated in cooperation with a hood lifting device 20 (FIG. 1) that lifts the rear end 10a of the hood 10. Although not described in detail, the hood lifting device 20 is designed to be actuated generally simultaneously with a not-shown inflator of the airbag device M, in order to lift the rear end 10a of the hood 10 and form a gap between the rear end 10a of the hood 10 and a cowl 7 for permitting emergence of an airbag 60.

Unless otherwise specified, front/rear, up/down and left/right directions in this description are intended to refer to front/rear, up/down and left/right directions of the vehicle V.

As shown in FIG. 1, the hood 10 covers an engine room ER of the vehicle V and is joined to the body structure of the vehicle V with hinge sections 13 which are located at left and right edges of the rear end region of the hood 10. The hood 10 of this embodiment is fabricated of a steel plate, a plate material of aluminum (aluminum alloy) or the like. As shown in FIG. 14, there is disposed a cowl 7 at the rear of the hood 10. The cowl 7 is composed of a cowl panel 7a which has high rigidity and belongs to the vehicle body structure, and a cowl louver 7b which is disposed above the cowl panel 7a and is fabricated of synthetic resin. The cowl louver 7b adjoins a lower region 4a of the front windshield 4 on the rear end. As shown in FIG. 1, the front pillars 5 (5L and 5R) are disposed on the left and right of the front windshield 4.

Referring to FIGS. 1 and 14, the airbag device M includes an airbag 60, a not-shown inflator that feeds an inflation gas to the airbag 60, and a case 28 that houses the airbag 60 and inflator. The airbag device M of this embodiment includes two inflators, though not depicted, each of which is connected to each of later-described inlet port 68L and 68R of the airbag 60.

The case 28 of this embodiment is fabricated from soft synthetic resin such as thermoplastic elastomer of polyolefin (TPO). As shown in FIG. 14, the case 28 is composed of two parts; an upper case 30 disposed on the upper side and a lower case 35 disposed on the lower side. As shown in FIG. 14, the case 28 is so designed that a rear region of each of the upper case 30 and lower case 35 bends at airbag deployment for forming an opening via which the airbag 60 is deployed rearward.

Figure 2:
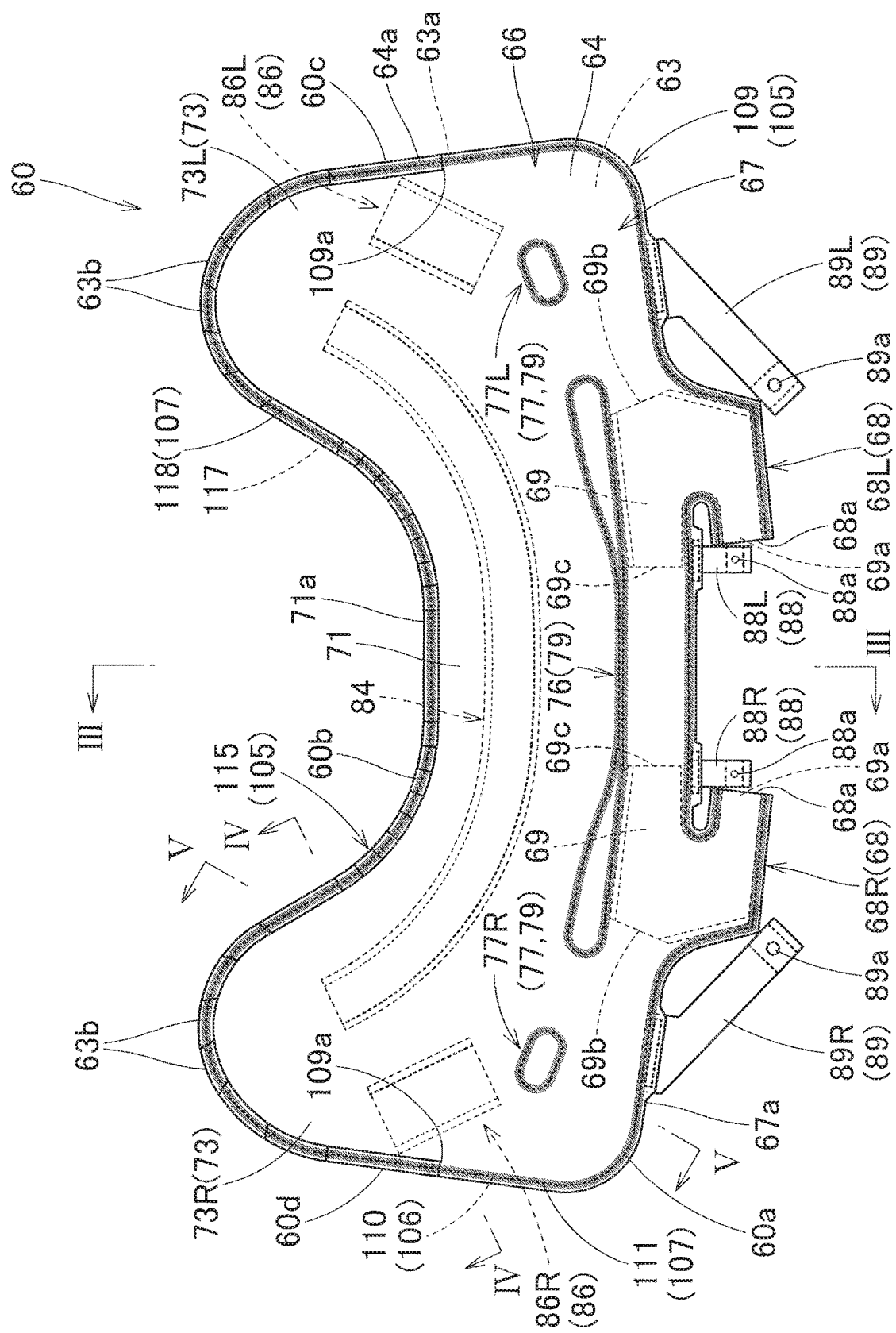
FIG. 2 is a plan view of the airbag of the embodiment.

The airbag 60 is designed to be inflated into a generally U shape elongated in a left and right direction, as viewed from the front, as shown in FIG. 2. The airbag 60 includes a transverse inflatable portion 66 that extends along the left and right direction and covers an upper side of the cowl 7 (cowl louver 7b), and a pair of vertical inflatable portions 73 (73L and 73R) each of which extends rearward from a vicinity of left/right end of the transverse inflatable portion 66 and covers a top surface (or front surface) 5a of the left/right front pillar 5L/5R (see double-dotted lines in FIG. 1). In this embodiment, the airbag 60 includes a pedestrian-side wall (first wall) 64 deployable on the upper side and a vehicle-side wall (second wall) 63 deployable on the lower side and opposed to the pedestrian-side wall 64. The airbag 60 is formed by joining outer circumferential edges 63a and 64a of the pedestrian-side wall 64 and vehicle-side wall 63 together by a joint region 105 that is formed along the outer circumferential edges 63a and 64a entirely except leading ends of later-described inlet ports 68. That is, the airbag 60 is inflatable by receiving an inflation gas and thereby separating the pedestrian side wall 64 and vehicle-side wall 63 from each other. The joint region 105 that joins the outer circumferential edges 63a and 64a of the vehicle-side wall 63 and pedestrian-side wall 64 together includes a sealing member 106 that is formed by application of a sealing agent of silicone resin, as described later, and a sewn seam 107 that is formed by running a sewing thread T through the area where the sealing member 106 is applied. In this embodiment, the pedestrian-side wall 64 and vehicle-side wall 63 are generally identical in outer contour.

The transverse inflatable portion 66 is designed to be deployed over a generally entire area in a vehicle-width direction (i.e. in a left and right direction) of the cowl 7. Particularly, the transverse inflatable portion 66 is designed to be deployed over an area extending across the cowl 7 and the lower region 4a of the front windshield 4, as shown in FIG. 1, with double-dotted lines, and FIG. 14. More specifically, as shown in FIG. 2, a front end region of the transverse inflatable portion 66 as deployed serves as an in-hood inflatable portion 67 while a rear end region of the transverse inflatable portion 66 as deployed serves as an out-of-hood inflatable portion 71. As shown in FIG. 14, at full deployment of the airbag 60, the in-hood inflatable portion 67 stays beneath the rear end 10a of the hood 10 and is hidden behind the hood 10 whereas the out-of-hood inflatable portion 71 protrudes out of the rear end 10a of the hood 10 and covers the area extending across the cowl 7 and the lower region 4a of the front windshield 4, at the rear of the in-hood inflatable portion 67. The out-of-hood inflatable portion 71 is in gas communication with the vertical inflatable portions 73L and 73R at vicinities of the left and right ends. At airbag deployment, the portions in the vicinities of the left and right ends of the out-of-hood inflatable portion 71 cover upper surfaces of vicinities of rear ends 9a of left and right fender panels 9L and 9R, as indicated with double-dotted lines in FIG. 1.

Figure 6:
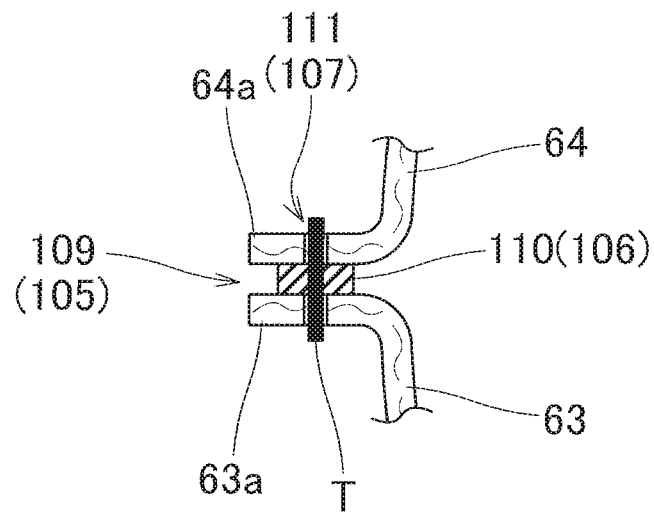
FIG. 6 is a partial enlarged sectional view of the airbag of FIG. 2 showing an adhered joint region.

The airbag 60 is provided, in a vicinity of the front edge of the in-hood inflatable portion 67 in the horizontal inflatable portion 66, a pair of inlet port sections 68 (68L and 68R) coupled with the not-shown inflators. The inlet port sections 68L and 68R are opposed to each other in a left and right direction. In this embodiment, openings 68a disposed at the leading ends of the inlet port sections 68L and 68R face inward in the left and right direction for receiving the inflators. Inside of each of the inlet port sections 68 is an inner tube 69 which enhances heat resistance and redirects the inflation gas toward the left and right. As shown in FIG. 6, each of the inner tubes 69 is trifurcate, and includes an opening 69a which is disposed in a vicinity of the opening 68a of the inlet port section 68, and an opening 69b and an opening 69c which are disposed on the left and right in front of a later-described center thickness regulating section 76.

Figure 8:
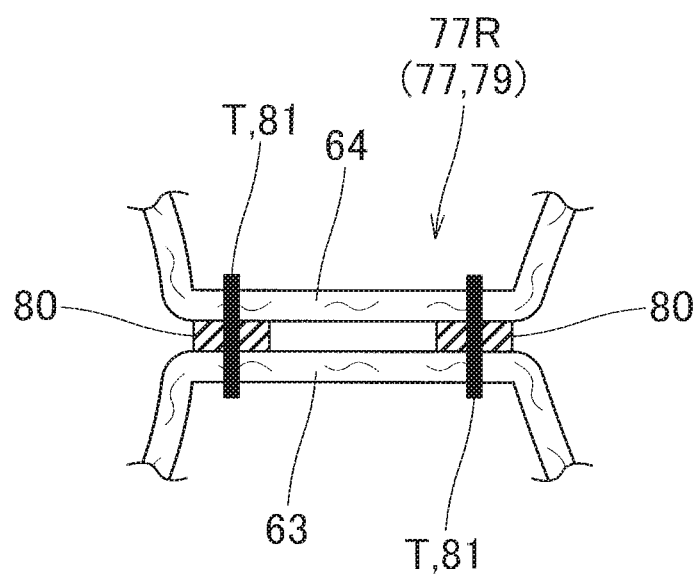
FIG. 8 is a partial enlarged sectional view of the airbag of FIG. 2 showing a side thickness regulating section (i.e. seam tether)

The airbag 60 of the embodiment is provided, within an area of the in-hood inflatable portion 67, a center thickness regulating section 76 and a pair of side thickness regulating sections 77 (77L and 77R) for regulating the thickness of the in-hood inflatable portion 67 at airbag deployment. The center thickness regulating section 76 is disposed at the center in the left and right direction of the in-hood inflatable portion 67, and formed into a generally rod shape elongated generally in the left and right direction. More specifically, the center thickness regulating section 76 is formed so long as to reach an area at the rear of each of the inlet port sections 68L and 68R such that the left and right end regions cover the areas at the rear of the inlet port sections 68L and 68R entirely in the left and right direction. Each of the side thickness regulating sections 77 is formed on the left/right of the center thickness regulating section 76, generally at the center of an area between one of the opposite ends of the center thickness regulating section 76 and the left/right edge of the in-hood inflatable portion 67. Each of the side thickness regulating sections 77 is generally oval in outer contour. Each of the center thickness regulating section 76 and the side thickness regulating sections 77L and 77R is a seam tether 79 that is formed by bringing the vehicle-side wall 63 and pedestrian-side wall 64 into direct contact with each other and joining them together. As shown in FIG. 8, in a similar fashion to the joint region 105 disposed in the outer circumferential edge of the airbag 60, each of the seam tethers 79 includes a sealing member 80 that is formed by application of a sealing agent of silicone resin, and a sewn seam 81 that is formed by running a sewing threads T through the area where the sealing member 80 is applied. Further, in a similar fashion to a later-described adhered joint region 109 of the joint region 105, the sealing member 80 of each of the seam tethers 79 is adhered to both of the vehicle-side wall 63 and pedestrian-side wall 64. The sealing member 80 is formed into a line the width of which is greater than that of the sewing thread T forming the sewn seam 81. The sewn seam 81 is formed by running the sewing threads T through the pedestrian-side wall 64 and vehicle-side wall 63 as well as the sealing member 80 disposed therebetween.

Further, at vicinities of the left and right inlet port sections 68L and 68R in the front edge of the in-hood inflatable portion 67 (i.e. in the front edge 60a of the airbag 60), there are provided a pair of mounting belts 88 (88L and 88R). Although not depicted in detail, each of the mounting belts 88 is connected and secured to the case 28 for preventing the airbag 60 from moving rearward at and after deployment. More specifically, the mounting belts 88 (88L and 88R) are disposed proximate to the openings 68a of the inlet port sections 68 on the inner side of the openings 68a. Each of the mounting belts 88 is provided with a mounting hole 88a for receiving a not-shown bolt (mounting member). Further, another pair of mounting belts 89 (89L and 89R) is disposed at a vicinity of an intermediate position between each of the inlet port sections 68L and 68R and each of left and right edges (i.e. a left edge 60c and a right edge 60d) of the airbag 60 in the front edge of the in-hood inflatable portion 67. Although not depicted in detail, each of the mounting belts 89 is connected and secured to the case 28 for preventing the airbag 60 from moving rearward at and after deployment. Each of the mounting belts 89 is provided with a mounting hole 89a for receiving the not-shown bolt serving as the mounting member.

The airbag 60 internally includes a center tether 84 and a pair of side tethers 86 (86L and 86R) each of which connects the pedestrian-side wall 64 and vehicle-side wall 63 for limiting a clearance between the pedestrian-side wall 64 and vehicle-side wall 63 at airbag deployment.

Figure 3:
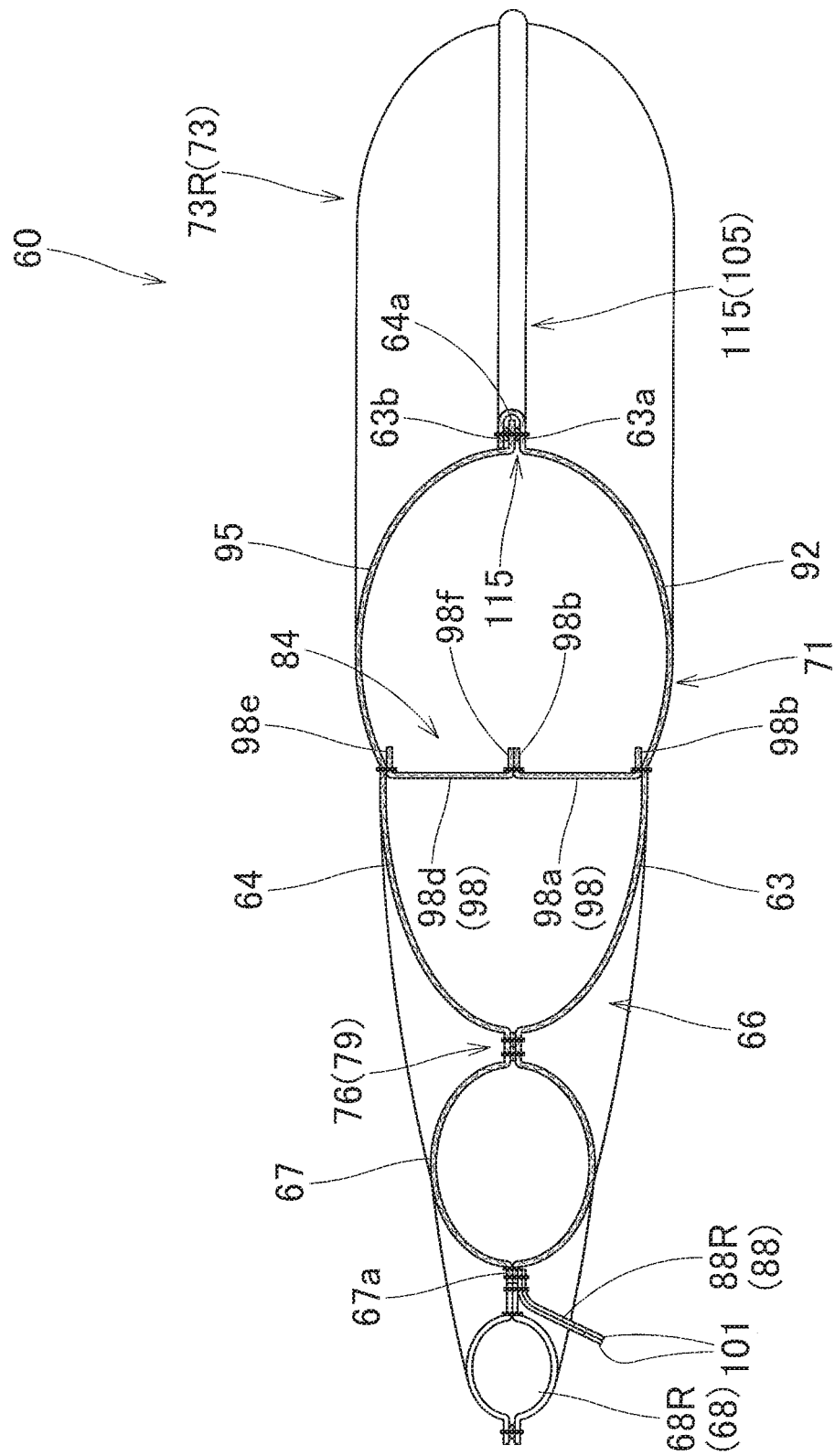
FIG. 3 is a sectional view of the airbag of FIG. 2 as inflated by itself, taken along line III-III of FIG. 2.
Figure 4:
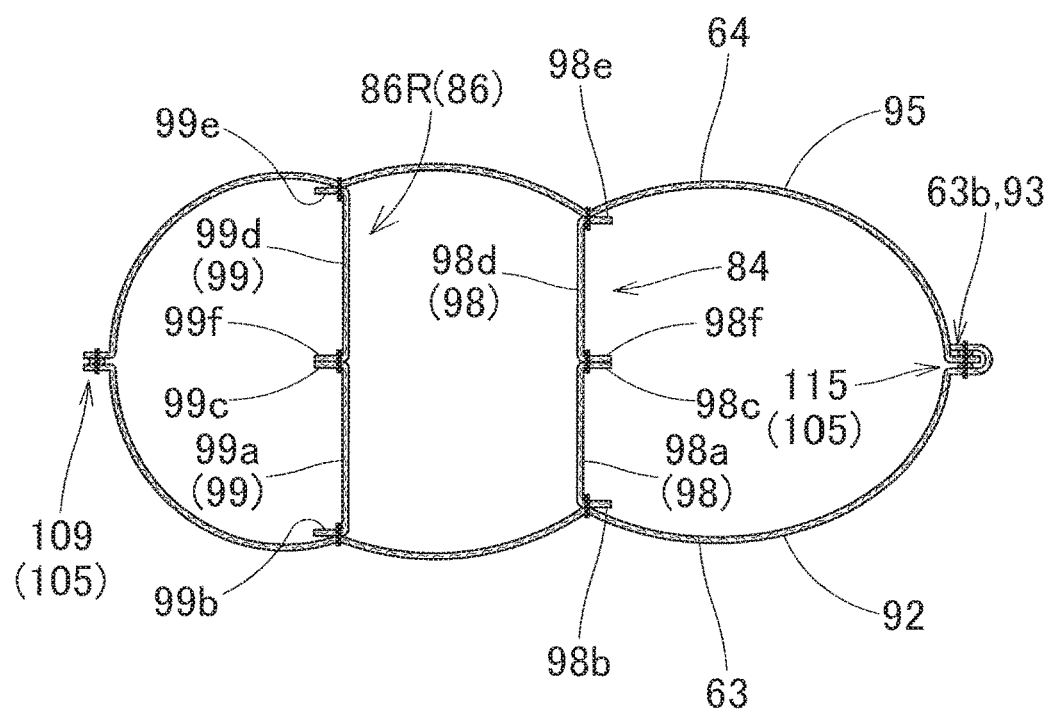
FIG. 4 is a sectional view of the airbag of FIG. 2 as inflated by itself, taken along line IV-IV of FIG. 2.
Figure 5:
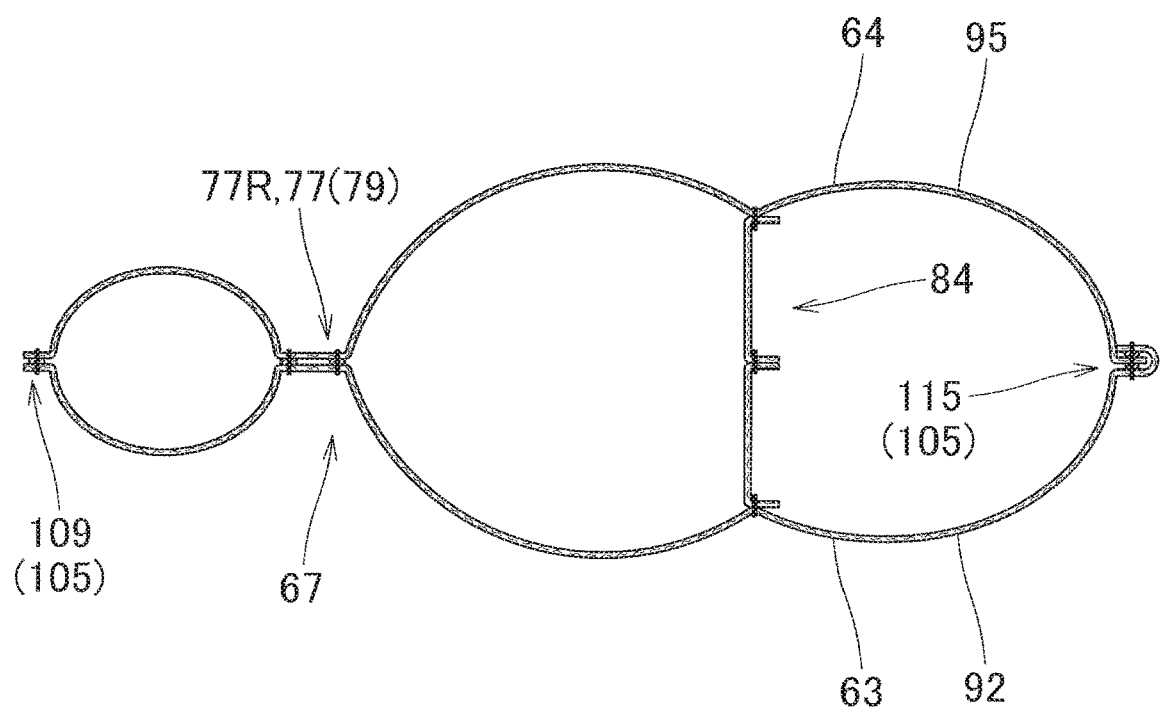
FIG. 5 is a sectional view of the airbag of FIG. 2 as inflated by itself, taken along line V-V of FIG. 2.
Figure 9:
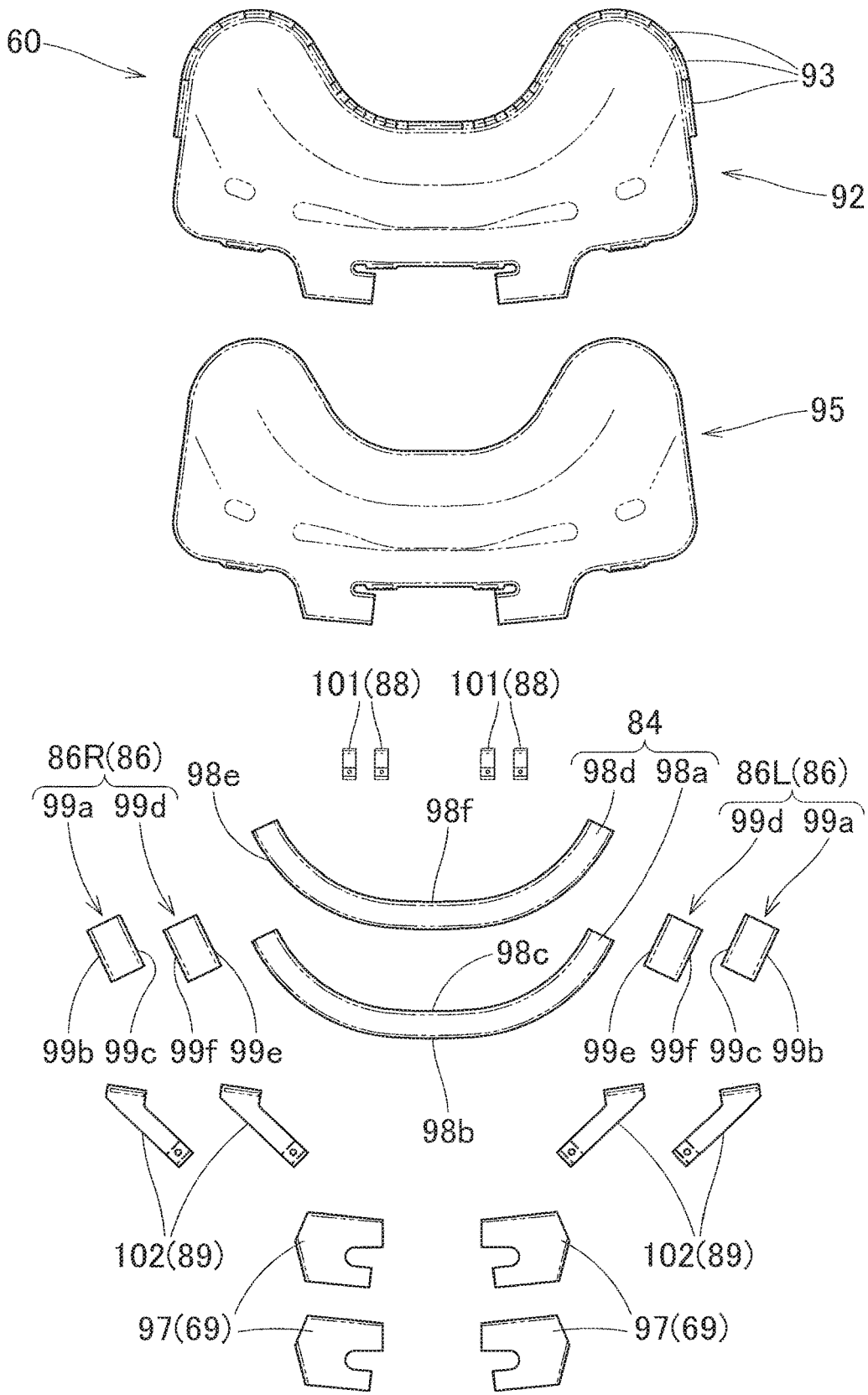
FIG. 9 illustrates materials (base cloths) of the airbag of FIG. 2 in plan views.

The center tether 84 is formed into a band and disposed in an area extending across the out-of-hood inflatable portion 71 and left and right vertical inflatable portions 73L and 73R, in such a manner as to curve gently, as a whole, generally along the rear edge 60b of the airbag 60 as laid flat, as shown in FIG. 2. More specifically, the center tether 84 is disposed at a generally intermediate position between the center thickness regulating section 76 and the rear edge 60b of the airbag 60, and curves such that the left and right ends are each disposed generally at the center in a front and rear direction and in a left and right direction of each of the vertical inflatable portion 73L/73R. As shown in FIGS. 3, 4 and 9, the center tether 84 of this embodiment is composed of two base cloths 98, i.e. a vehicle-side member 98a joined to the vehicle-side wall 63 and a pedestrian-side member 98d joined to the pedestrian-side wall 64. The center tether 84 is formed by sewing together edges 98c and 98f of the vehicle-side member 98a and pedestrian-side member 98d, which edges 98c and 98f being respectively apart from the edges 98b and 98e joined to the vehicle-side wall 63 and pedestrian-side wall 64.

The side tethers 86 (86L and 86R) are disposed on outer sides of the left and right ends of the center tether 84. Specifically, each of the side tethers 86 (86L and 86R) is disposed at a vicinity of a portion where the left/right vertical inflatable portion 73L/73R and the out-of-hood inflatable portion 71 of the transverse inflatable portion 66 intersect. Each of the side tethers 86 is disposed at a slant with respect to a left and right direction such that the inner side in the left and right direction is located farther forward while the outer side in the left and right direction is located rearward. As shown in FIGS. 4 and 9, each of the side tethers 86 of this embodiment is composed of two base cloths 99, i.e. a vehicle-side member 99a joined to the vehicle-side wall 63 and a pedestrian-side member 99d joined to the pedestrian-side wall 64. Each of the side tethers 86 is formed by sewing together edges 99c and 99f of the vehicle-side member 99a and pedestrian-side member 99d, which edges 99c and 99f being respectively apart from the edges 99b and 99e joined to the vehicle-side wall 63 and pedestrian-side wall 64. As shown in FIG. 4, each of the side tethers 86 of this embodiment is slightly greater in length than the center tether 84 so as to make a clearance between the pedestrian-side wall 64 and vehicle-side wall 63 at the locations of the side tethers 86 slightly greater than that at the location of the center tether 84, at airbag deployment.

As shown in FIG. 9, the airbag 60 is composed of a vehicle-side base cloth 92 for forming the vehicle-side wall 63, a pedestrian-side base cloth 95 for forming the pedestrian-side wall 64, inner tube base cloths 97 for forming the inner tubes 69, base cloths 98 for forming the center tether 84, base cloths 99 for forming the side tethers 86L and 86R, base cloths 101 for forming the mounting belts 88, and base cloths 102 for forming the mounting belts 89. In this embodiment, each of these base cloths (base materials) is formed of a woven fabric of polyester yarns, polyamide yarns or the like, coated with a coating agent of silicone resin for preventing gas leakage. The coated surface, which is formed by application of the coating agent, is disposed on the inner surface of each of the vehicle-side base cloth 92 and pedestrian-side base cloth 95.

The joint region 105 that joins the outer circumferential edges 63a and 64a of the vehicle-side wall 63 and pedestrian-side wall 64 together includes a sealing member 106 that is formed by application of a sealing agent of silicone resin and a sewn seam 107 that is formed by running a sewing thread through the application area of the sealing member 106.

Figure 7:
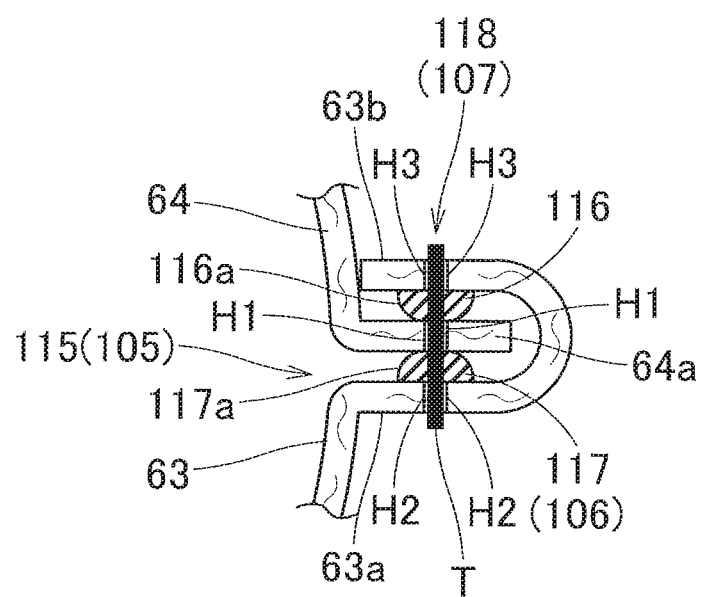
FIG. 7 is a partial enlarged sectional view of the airbag of FIG. 2 showing a non-adhered joint region.

As shown in FIGS. 6 and 7, the sealing member 106 is disposed between the outer circumferential edges 63a and 64a of the pedestrian-side wall 64 and the vehicle-side wall 63, and is continuously formed over an entire area of the joint region 105, as shown in FIG. 2. The sealing member 106 of this embodiment is formed into a line the width of which is greater than that of the sewing thread T forming the sewn seam 107. The silicone resin forming the sealing member 106 is the same material as that of the coating agent described above. The sealing member 106 has elasticity, and has adhesiveness to the surfaces of the vehicle-side wall 63 and pedestrian-side wall 64, at the time of application, i.e. in an unsolidified state.

The sewn seam 107 is formed to go through the sealing member 106. As shown in FIGS. 2, 6 and 7, the sewn seam 107 is continuously formed over the entire area of the joint region 105 by running the sewing threads T through the pedestrian-side wall 64 and vehicle-side wall 63 including the sealing member 106 disposed there between. More specifically, the sewn seam 107 is composed by lockstitch.

The joint region 105 of this embodiment includes a non-adhered joint region 115 and an adhered joint region 109.

As shown in FIG. 6, the adhered joint region 109 includes an adhered sealing member 110 that is adhered to the outer circumferential edges 64a and 63a of both of the pedestrian-side wall 64 and the vehicle-side wall 63. A sewn seam 111 of the adhered joint region 109 is formed by running the sewing threads T through the adhered sealing member 110, in such a manner as to go through the adhered sealing member 110. The adhered joint region 109 is so formed that a line which connects opposite ends 109a of the adhered joint region 109 intersects with the center tether 84 and side tethers 86 or is disposed in an outer area (or in front) of the center tether 84 and side tethers 86. The adhered joint region 109 of this embodiment is disposed in a generally front half area of the airbag 60 as laid flat such that the line connecting the opposite ends 109a intersects with the center tether 84 and side tethers 86. More specifically, as shown in FIG. 6, the adhered joint region 109 is so formed as to extend from a position in front of the center in a front and rear direction of each of the left edge 60c and right edge 60d of the airbag 60 to the front edge 60a of the airbag 60.

The non-adhered joint region 115 is disposed in an area of the joint region 105 except the adhered joint region 109. Particularly, the non-adhered joint region 115 is disposed in a generally rear half area of the airbag 60 as laid flat. As shown in FIG. 7, the non-adhered joint region 115 of this embodiment includes a non-adhesive sealing member 116 that is adhered to the vehicle-side wall 63 but not adhered to the pedestrian-side wall 64. Here, the vehicle-side wall 63 serves as an adhesion wall whereas the pedestrian-side wall 64 serves as a non-adhered wall. The non-adhesive sealing member 116 is formed by applying a sealing agent to the vehicle-side wall 63 and solidifying it such that the outer surface of the non-adhesive sealing member 116 except the surface adhered to the vehicle-side wall 63 serves as a non-adhered surface 116a. The non-adhered joint region 115 of this embodiment further includes a second sealing member 117 which is disposed at a position immediately above the non-adhesive sealing member 116.

Specifically, in the airbag 60 of this embodiment, the vehicle-side wall (i.e. adhesion wall) 63 includes an extended region 63b which is disposed on an outer side of the non-adhesive sealing member 116, and the second sealing member 117 is adhered to the extended region 63b. The second sealing member 117 is formed by applying a sealing agent to the extended region 63b of the vehicle-side wall 63 and solidifying it, such that the outer surface of the second sealing member 117 except the surface adhered to the vehicle-side wall 63 is a non-adhesive surface 117a. As shown in FIG. 7, the second sealing member 117 is disposed at a position immediately above the non-adhesive sealing member 116, in a state that the outer circumferential edge 64a of the pedestrian-side wall (i.e. non-adhered wall) 64 is interposed between the vehicle-side wall 63 and the extended region 63b as turned up. Similarly to the non-adhesive sealing member 116, the second sealing member 117 is formed into a line the width of which is greater than that of the sewing thread T forming a sewn seam 118.

In the non-adhered joint region 115, the sewn seam 118 is formed, in a state that the non-adhesive surfaces 116a and 117a are pressed against the pedestrian-side wall 64, by running the sewing threads T through the non-adhesive sealing member 116 disposed between the pedestrian-side wall 64 and vehicle-side wall 63, and the second sealing member 117 disposed between the pedestrian-side wall 64 and extended region 63b, in such a manner as to go through the non-adhesive sealing member 116 and second sealing member 117. That is, the non-adhered joint region 115 is formed by inserting the outer circumferential edge 64a of the pedestrian-side wall (i.e. non-adhered wall) 64 between the outer circumferential edge 63a of the vehicle-side wall 63 and extended region 63b, pressing the non-adhesive surface 116a of the non-adhesive sealing member 116 and non-adhesive surface 117a of the second sealing member 117 against the pedestrian-side wall 64, and running the sewing threads T through the non-adhesive sealing member 116 and second sealing member 117, and forming the sewn seam 118 going through the non-adhesive sealing member 116 and second sealing member 117.

Figure 10:
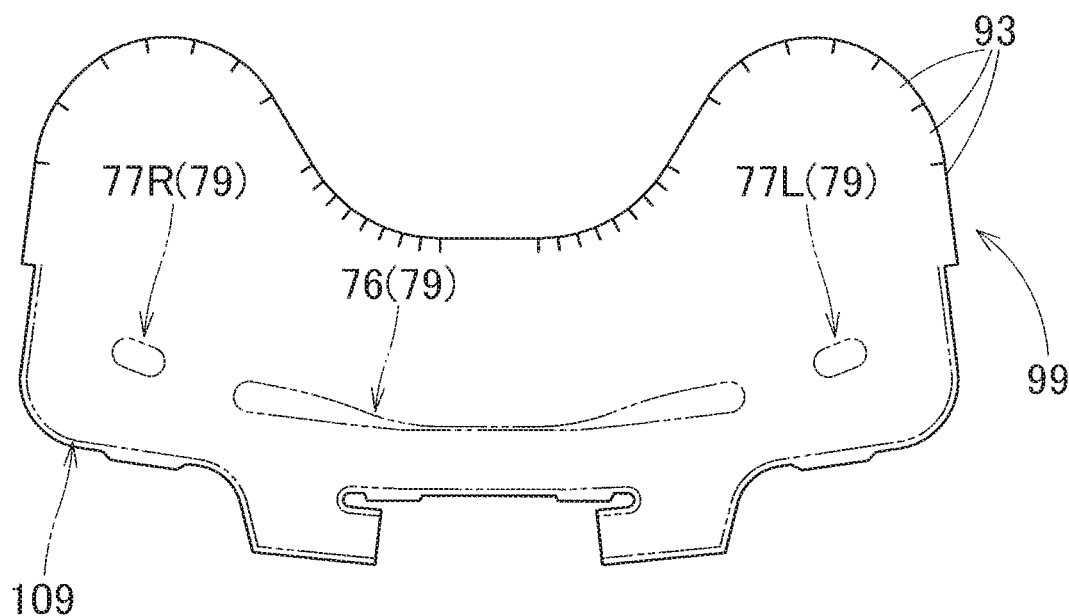
FIG. 10 is a diagram illustrating a part of the production process of the airbag of the embodiment.
Figure 10:
Figure 10:
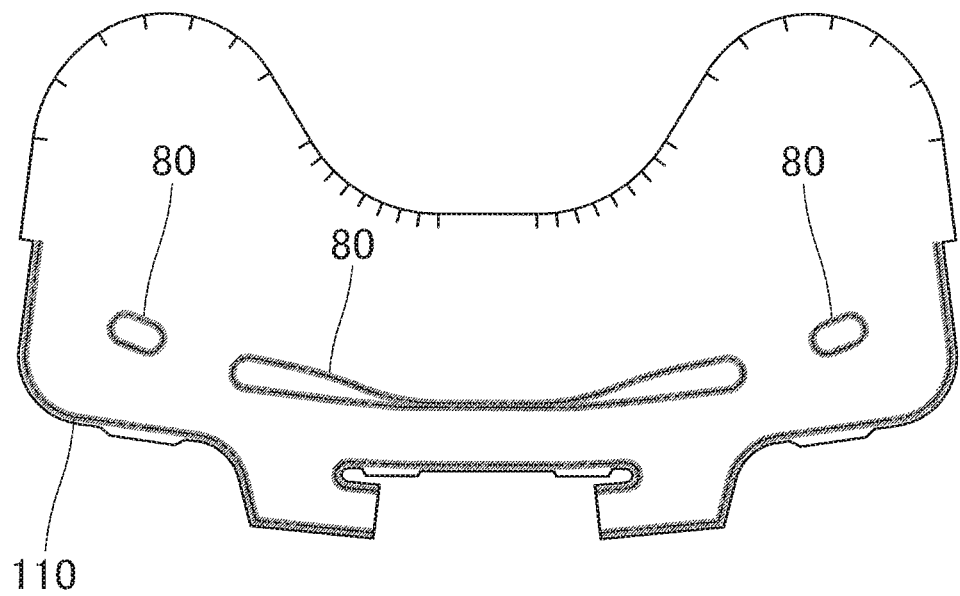

In this embodiment, as shown in FIG. 2, the non-adhered joint region 115 is disposed in a curving area extending across the outer circumferential edges of the vertical inflatable portions 73L and 73R and the rear edge of the transverse inflatable portion 66. Accordingly, as shown in FIGS. 9 and 10, the extended region 63b extending from the outer circumferential edge 63a of the vehicle-side wall 63 is composed of an extended region 93 of the vehicle-side base cloth 92 which extends outwardly from the outer circumferential edge 63a of the vehicle-side wall 63 and is slit in places to be discontinuous. When the extended regions 63b (93) are turned up on the outer circumferential edge 64a of the pedestrian-side wall 64, the extended regions 63b (93) include overlapping portions at the distal end regions, and the second sealing member 117 is continuously disposed above the non-adhesive sealing member 116.

Figure 11:
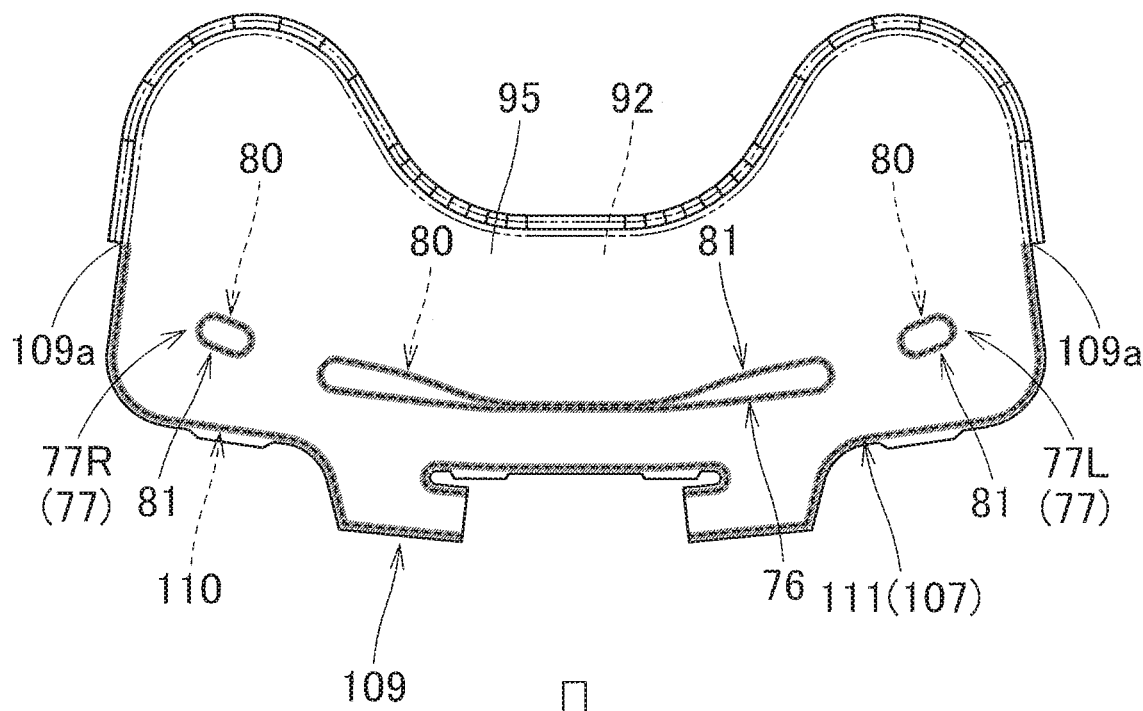
FIG. 11 is a diagram illustrating a part of the production process of the airbag of the embodiment, following the step shown in FIG. 10.
Figure 11:
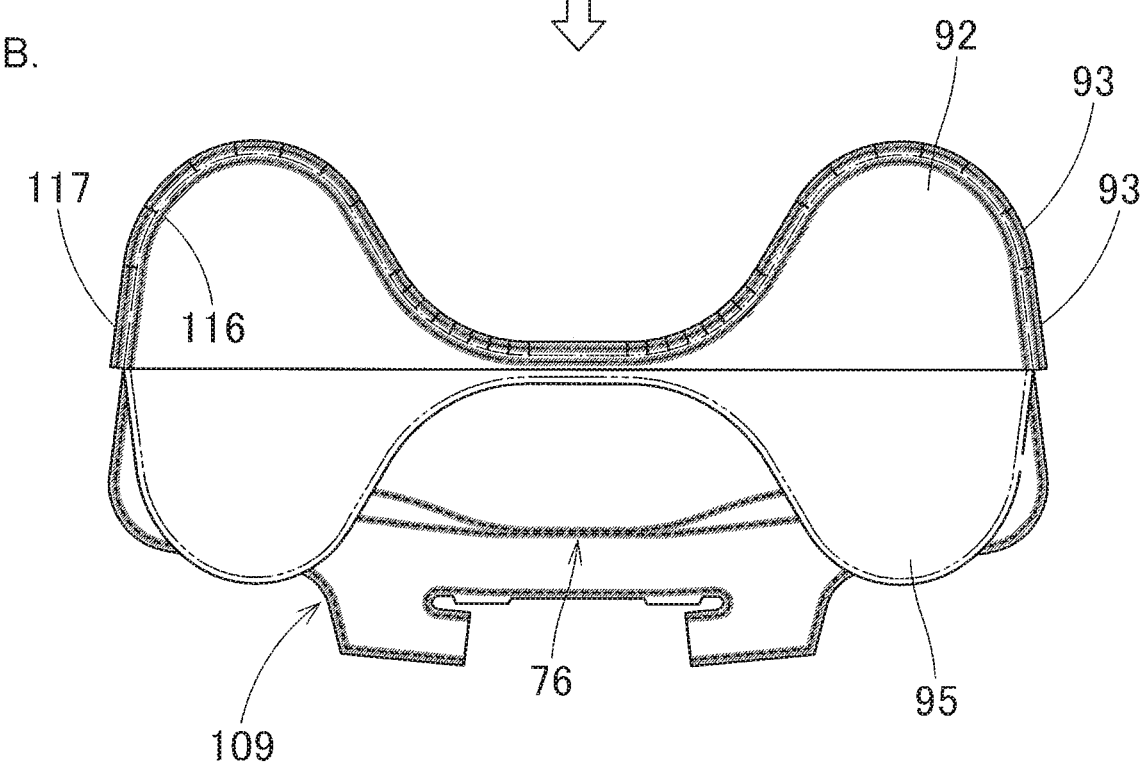

Production of the airbag 60 is now described. Firstly, as shown in A. and B. of FIG. 10, a sealing agent is applied to an area to form the adhered joint region 109 and areas to form the seam tethers 79 (i.e. the center thickness regulating section 76 and side thickness regulating sections 77L and 77R) on the inner surface of the vehicle-side base cloth 92 as laid flat. Then the pedestrian-side base cloth 95 is laid over the vehicle-side base cloth 92 before the sealing agent is solidified, in order to form the adhered sealing member 110 and sealing members 80 each of which is adhered to both of the vehicle-side base cloth 92 (i.e. vehicle-side wall 63) and the pedestrian-side base cloth 95 (i.e. pedestrian-side wall 64). After the adhered sealing member 110 and sealing members 80 are dried, the sewn seams 111 and 81 are formed by running the sewing threads T through the vehicle-side base cloth 92 (i.e. vehicle-side wall 63) and the pedestrian-side base cloth 95 (i.e. pedestrian-side wall 64) including the sealing member 110 and sealing members 80. Thus the adhered joint region 109, the center thickness regulating section 76 and side thickness regulating sections 77L and 77R are formed, as shown in A. of FIG. 11. Subsequently, the pedestrian-side base cloth 95 is turned up on the opposite ends 109a of the adhered joint region 109 so as to expose the inner surface of the vehicle-side base cloth 92. Then the sealing agent is applied to an area to form the non-adhesive sealing member 116 of the non-adhesive joint region 105 and the extended region 93 where the second sealing member 117 is to be formed, on the inner surface of the vehicle-side base cloth 92, and solidified. Thus the non-adhesive sealing member 116 having the non-adhesive surface 116a and the second sealing member 117 having the non-adhesive surface 117a are formed, as shown in B. of FIG. 11

Figure 12:
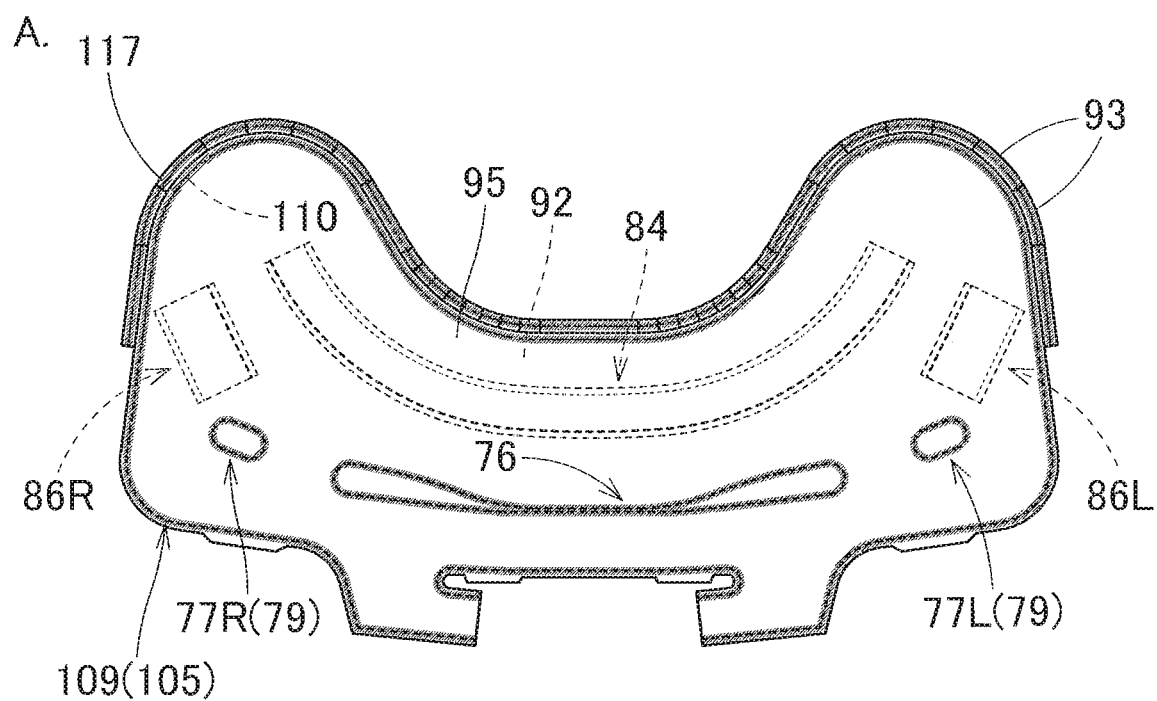
FIG. 12 is a diagram illustrating a part of the production process of the airbag of the embodiment, following the step shown in FIG. 11.
Figure 12:
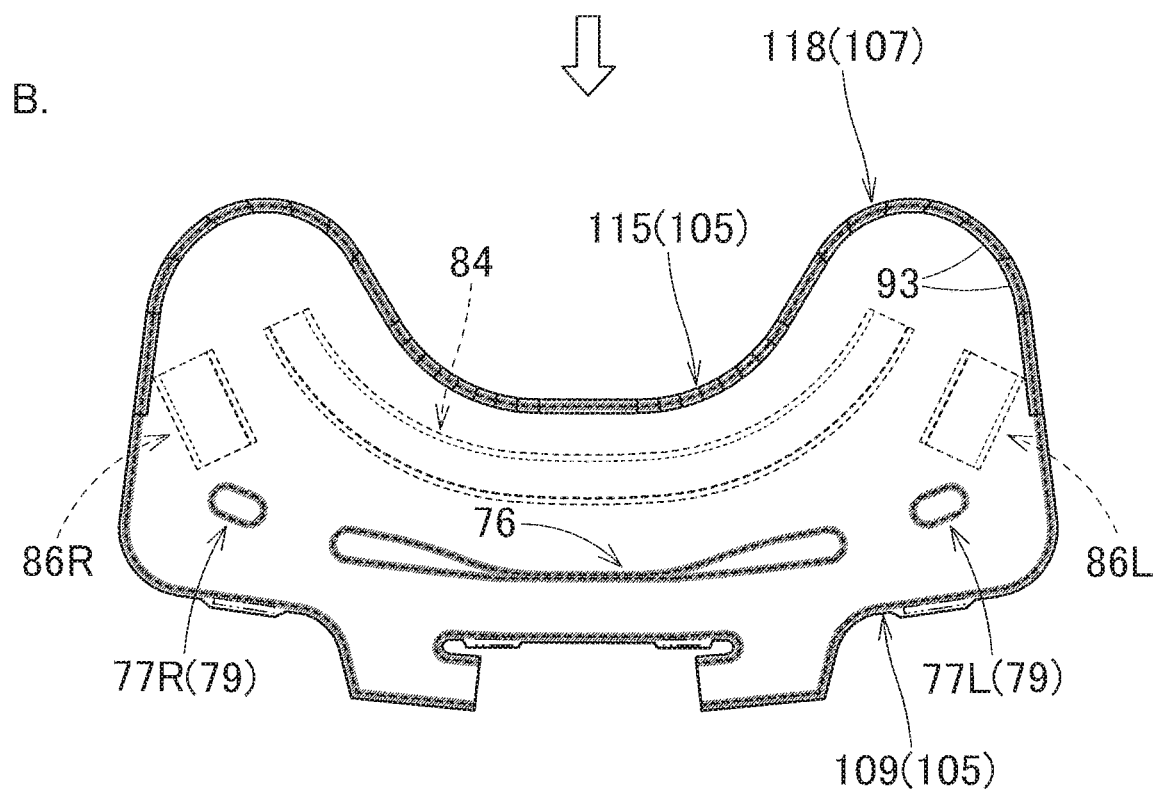

Subsequently, as shown in A. of FIG. 12, the center tether 84 and side tethers 86 are joined to the pedestrian-side wall 64 and vehicle-side wall 63. More specifically, the edges 99b of the vehicle-side members 99a of the base cloths 99 and the edge 98b of the vehicle-side member 98a of the base cloth 98 are joined to the vehicle-side base cloth 92. Similarly, the edges 99e of the pedestrian-side members 99d of the base cloths 99 and the edge 98e of the pedestrian-side member 98d of the base cloth 98 are joined to the pedestrian-side base cloth 95. Thereafter, the edges 99c of the vehicle-side members 99a and edges 99f of the pedestrian-side members 99d are respectively sewn together to form the side tethers 86. Then the edge 98c of the vehicle-side member 98a and the edge 98f of the pedestrian-side member 98d are sewn together to form the center tether 84.

Figure 13:
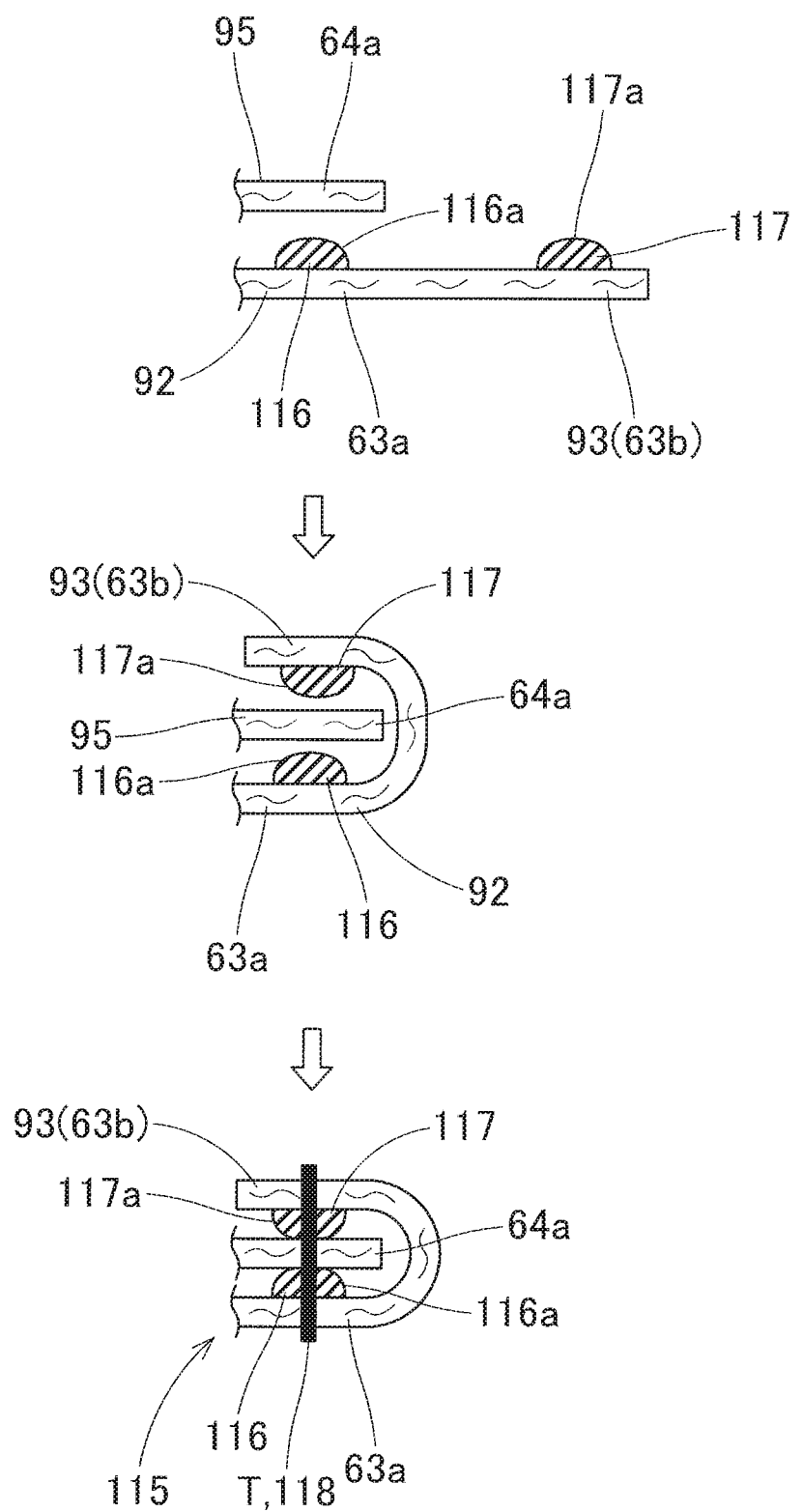
FIG. 13 is a schematic sectional view illustrating a step of forming the non-adhered joint region, in the production process of the airbag.

Thereafter, the pedestrian-side base cloth 95 is laid over the vehicle-side base cloth 92, and the extended regions 93 of the vehicle-side base cloth 92 are turned up on the pedestrian-side base cloth 95. Then the rear area of the outer circumferential edges 63a and 64a of the pedestrian-side base cloth 95 (i.e. pedestrian-side wall 64) and the vehicle-side base cloth 92 (i.e. vehicle-side wall 63) are sewn up with the sewing threads T, thereby forming the sewn seam 118 as well as the non-adhered joint region 115, as shown in B. of FIG. 12. At this time, as shown in FIG. 13, the sewn seam 118 is formed by sandwiching the pedestrian-side base cloth 95 (i.e. pedestrian-side wall 64) between the outer circumferential edge 63a of the vehicle-side base cloth 92 (i.e. vehicle-side wall 63) and the extended regions 63b (93) such that the non-adhesive surface 116a of the non-adhesive sealing member 116 and the non-adhesive surface 117a of the second sealing member 117 are pressed against the outer circumferential edge 64a of the pedestrian-side base cloth 95 (i.e. pedestrian-side wall 64), and sewing up the outer circumferential edges 63a and 64a of vehicle-side base cloth 92 (i.e. vehicle-side wall 63) and the pedestrian-side base cloth 95 (i.e. pedestrian-side wall 64) and the extended regions 63b by running the sewing threads T through the vehicle-side base cloth 92 (i.e. vehicle-side wall 63), the pedestrian-side base cloth 95 (i.e. pedestrian-side wall 64) and the extended regions 63b including the non-adhesive sealing member 116 and the second sealing member 117. The sewn seam 118 is so formed that the terminals overlap the terminals of the sewn seam 111 of the adhered joint region 109, such that the sewn seam 118 and sewn seam 111 are continuous.

Thereafter, the base cloths 101 are sewn to the front edge of the airbag 60 to form the mounting belts 88, the base cloths 102 are sewn to the front edge of the airbag 60 to form the mounting belts 89, and the inner tubes 69, which have been prepared in advance, are inserted into the inlet port sections 68. Thus the airbag 60 is completed.

Then the airbag 60 is folded up to be housed inside the case 28, and the not-shown inflators are connected to the airbag 60. If the airbag 60 as well as the inflators are then stored inside the case 28, the airbag device M is completed. Mounting of the airbag device M on the vehicle V is then completed by connecting the lead wires extending from the inflators are connected to a not-shown actuating circuit, and mounting the case 28 on the hood 10 through the use of not-shown supporting brackets.

With the airbag device M of the embodiment, when the not-shown actuating circuit detects an impact against a pedestrian based on a signal fed from the not-shown sensor mounted on the front bumper 6, the hood lifting device 20 will be actuated and push up the rear end 10a of the hood 10. Generally simultaneously, the inflators will be actuated and inflate the airbag 60, and the airbag 60 will push and open the rear region of the case 28, and emerge out of the case 28. The airbag 60 will then be deployed rearwardly and upwardly while protruding rearward, and cover the top surface of the cowl 7 and front surfaces (top surfaces) 5a of the front pillars 5L and 5R, as shown in FIGS. 1 (double-dotted lines) and 14.

In the airbag 60 used in the airbag device M of the embodiment, the sealing member 106 (non-adhesive sealing member 116) of the joint region 105 (non-adhered joint region 115) that joins the outer circumferential edges 63a and 64a of the pedestrian-side wall 64 and vehicle-side wall 63 is configured such that the solidified, thus non-adhesive surface 116a is pressed against the pedestrian-side wall 64. With this configuration, the non-adhered joint region 115 can be formed by preparing the non-adhesive sealing member 116 in advance, connecting the center tether 84 and side tethers 86, then placing the non-adhesive sealing member 116 between the outer circumferential edges 63a and 64a of the pedestrian-side wall 64 and vehicle-side wall 63, and by sewing up the outer circumferential edges 63a and 64a. Moreover, in the airbag 60 of this embodiment, the non-adhered joint region 115 includes the non-adhesive sealing member 116. Although the non-adhesive sealing member 116 is not adhered to the pedestrian-side wall 64, its solidified, thus non-adhesive surface 116a is pressed against the pedestrian-side wall 64. With this configuration, in the pedestrian-side wall 64, the non-adhesive sealing member 116 is pressed against and thus stops the holes which are formed on the pedestrian-side wall 64 by penetration of the sewing threads T (i.e. the gaps H1 formed between the pedestrian-side wall 64 and sewing threads T), thereby preventing a gas leakage from the gaps H1, i.e. from the non-adhered joint region 115, at airbag deployment.

Therefore, the airbag 60 of the embodiment can be easily manufactured though it is internally provided with the center tether 84 and side tethers 86, and has a reduced fear of gas leakage from the non-adhered joint region 115.

In the airbag 60 of the embodiment, the non-adhesive sealing member 116 of the non-adhered joint region 115 is adhered to the vehicle-side wall 63. That is, the non-adhesive sealing member 116 can be prepared in advance on the vehicle-side wall 63. Since the non-adhesive sealing member 116 of the non-adhered joint region 115 is adhered to the vehicle-side wall 63, the non-adhesive sealing member 116 covers a surrounding area of the vehicle-side wall 63 and sewing threads T on the vehicle-side wall 63 without leaving any gaps. Accordingly, the non-adhesive sealing member 116 stops the gaps H2 formed between the vehicle-side wall 63 and sewing threads T, thereby preventing a gas leakage from the gaps H2, i.e. from the vehicle-side wall 63, at airbag deployment, similarly to conventional airbags. As a consequence, a gas leakage from the non-adhered joint region 115 at airbag deployment will be further prevented.

The airbag 60 of the embodiment is formed by a production process including: applying a sealing agent to the vehicle-side wall 63 and solidifying it so as to form the non-adhesive sealing member 116; mounting the center tether 84 and side tethers 86 such that the tethers 84 and 86 connect the vehicle-side wall 63 and pedestrian-side wall 64; and sewing the outer circumferential edges 63a and 64a of the vehicle-side wall 63 and pedestrian-side wall 64 together with the sewing threads T to form the non-adhered joint region 115. This production method will eliminate the need for a work of turning up one of the overlaid walls and separating the same from the other wall little by little for application of a sealing member as in a conventional airbag, thus facilitate the production of the airbag 60. Further, as shown in FIG. 2, even though the application area of the sealing member (i.e. non-adhesive sealing member 116) is disposed proximate to the side tethers 86L and 86R, this configuration will also prevent a portion of the sealing member proximate to the tethers from becoming bulky. Therefore, the airbag 60 can be produced easily even though the side tethers 86L and 86R are disposed proximate to the non-adhered joint region 115.

Figure 15:
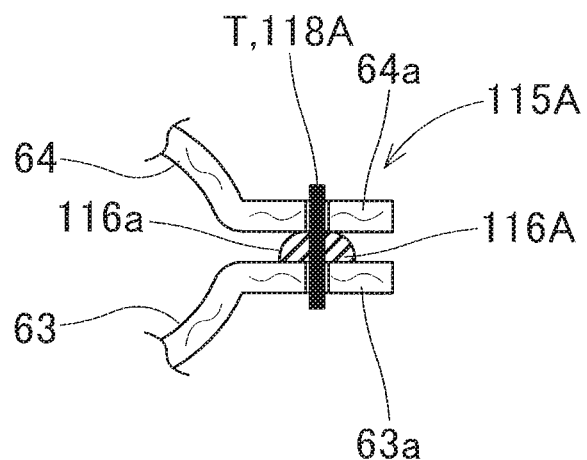
FIG. 15 is a partial enlarged sectional view of a modification of the non-adhered joint region.

In the airbag 60 of the embodiment, the vehicle-side wall 63 to which the non-adhesive sealing member 116 is adhered includes the extended region 63b. The extended region 63b is disposed on an outside of the non-adhesive sealing member 116, and the second sealing member 117 is adhered to the extended region 63b. The non-adhered joint region 115 is formed by sandwiching the outer circumferential edge 64a of the pedestrian-side wall 64 between the non-adhesive sealing member 116 and the second sealing member 117, and joining the outer circumferential edge 64a of the pedestrian-side wall 64 with the vehicle-side wall 63 by sewing which runs the sewing threads T through the non-adhesive sealing member 116 and second sealing member 117. Accordingly, the pedestrian-side wall 64 is pressed by the non-adhesive surface 116a of the non-adhesive sealing member 116 and the non-adhesive surface 117a of the second sealing member 117 on both surfaces. That is, the non-adhesive sealing member 116 and the second sealing member 117 are pressed against and stop the holes formed on the pedestrian-side wall 64 by penetration of the sewing threads T (i.e. the gaps H1 formed between the pedestrian-side wall 64 and sewing threads T) from both sides, thus preventing gas leak from the gaps H1 further adequately. Moreover, since the second sealing member 117 is adhered to the extended region 63b of the vehicle-side wall 63 in a similar fashion to the non-adhesive sealing member 116, the second sealing member 117 covers a surrounding area of the extended region 63b and sewing threads T on the extended region 63b without leaving any gaps. Accordingly, the second sealing member 117 stops the gaps H3 formed between the extended region 63b and sewing threads T, thereby preventing a gas leakage from the extended region 63b, at airbag deployment. As a consequence, a gas leakage from the pedestrian-side wall 64 of the non-adhered joint region 115 will be prevented adequately, and a gas leakage from the non-adhered joint region 115 at airbag deployment will be prevented further adequately. If such an advantageous effect does not have to be considered, a non-adhered joint region 115A may be provided only with a non-adhesive sealing member 116A adhered to the vehicle-side wall 63, but with no second sealing member, as shown in FIG. 15.

In addition to the non-adhered joint region 115 which includes the non-adhesive sealing member 116 having the non-adhesive surface 116a pressed against the pedestrian-side wall 64, the airbag 60 of the embodiment further includes the adhered joint region 109 which includes the adhered sealing member 110 that is adhered to the outer circumferential edges 64a and 63a of both of the pedestrian-side wall 64 and the vehicle-side wall 63. Since the adhered joint region 109 has a good sealing property and has a limited fear of gas leakage, the combination of the non-adhered joint region 115 and adhered joint region 109 will further adequately prevent a gas leakage from the joint region 105 in comparison with an instance where the joint region is composed of the non-adhered joint region 115 only. This configuration is thus preferable in such an airbag for pedestrian protection as in this embodiment that has a great volume and is required to maintain a high internal pressure for a relatively long time after completion of deployment.

In the airbag 60 of the embodiment, the adhered joint region 109 is disposed in the front area of the circumferential edge, b except the area required for mounting of the center tether 84 and side tethers 86. More specifically, the adhered joint region 109 is disposed in a half area of the entire length of the joint region 105 such that the line connecting the opposite ends 109a intersects with the center tether 84 and side tethers 86. When the airbag 60 including such an adhered joint region 109 is formed, a sealing agent for forming the adhered sealing member 110 is firstly applied to the vehicle-side wall 63, the outer circumferential edges 64a and 63a of the pedestrian-side wall 64 and the vehicle-side wall 63 are adhered together and the sewn seam 111 is formed to form the adhered joint region 109, before mounting of the center tether 84 and side tethers 86 on the pedestrian-side wall 64 and vehicle-side wall 63. Then the center tether 84 and side tethers 86 are mounted on the pedestrian-side wall 64 and vehicle-side wall 63. Accordingly, even though the airbag 60 includes the adhered sealing member 110 (adhered joint region 109) which are adhered to both of the pedestrian-side wall 64 and vehicle-side wall 63, the production of the airbag 60 will not need a work of turning up one of the overlaid walls and separating the same from the other wall little by little for application of a sealing member, as in a conventional airbag.

Figure 16:
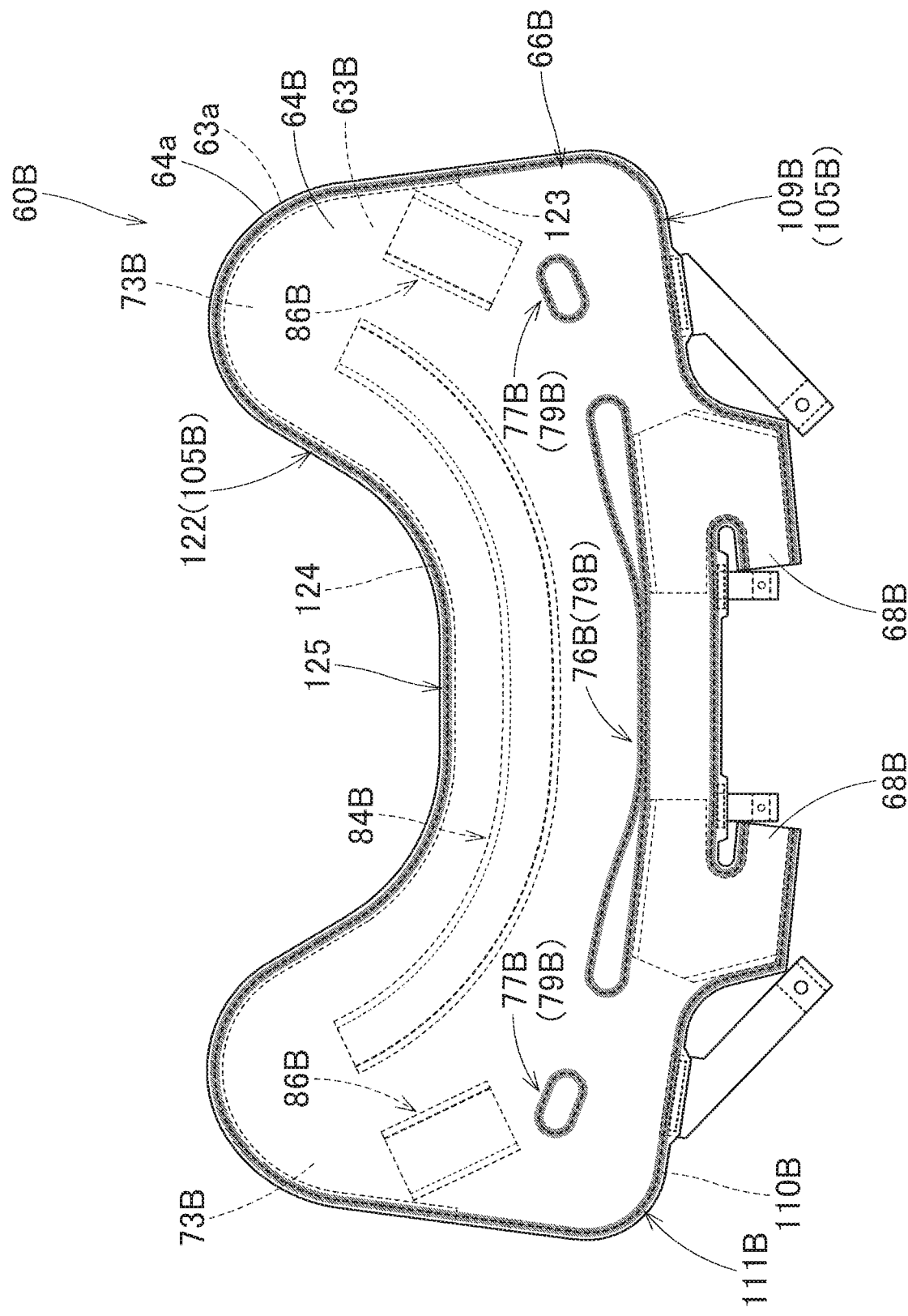
FIG. 16 is a plan view of an airbag of an alternative embodiment.

An airbag 60B of an alternative embodiment is now described. As shown in FIG. 16, the airbag 60B has a similar configuration to the airbag 60 described above except in a non-adhered joint region 122 of a joint region 105B. Thus, common members will be given a reference sign "B" at the end of common reference numerals, and detailed descriptions of those members will be omitted.

Figure 17:
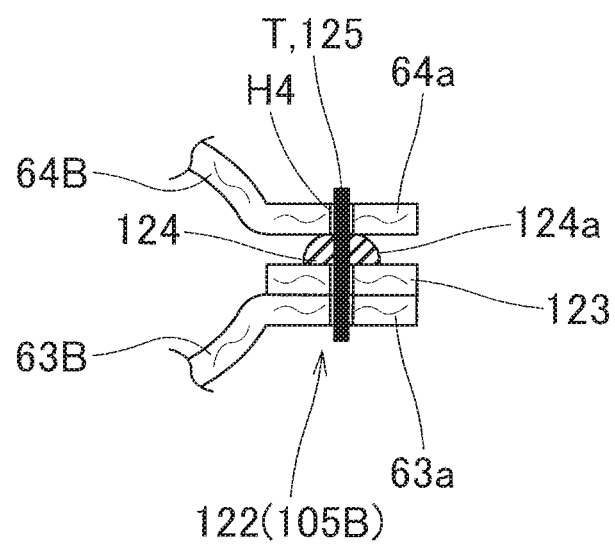
FIG. 17 is a partial enlarged sectional view of the airbag of FIG. 16 showing a non-adhered joint region.

As shown in FIG. 17, the non-adhered joint region 122 of the airbag 60B includes a non-adhesive sealing member 124 between the pedestrian-side wall 64B and vehicle-side wall 63B. The non-adhesive sealing member 124 is adhered to a base member 123 which is formed into a band shape corresponding to the non-adhered joint region 122 in outer contour, and is disposed, together with the base member 123, between the outer circumferential edges 64a and 63a of the pedestrian-side wall 64B and the vehicle-side wall 63B. The non-adhered joint region 122 further includes a sewn seam 125 which is formed by running a sewing thread T through the application area of the non-adhesive sealing member 124.

Figure 18:
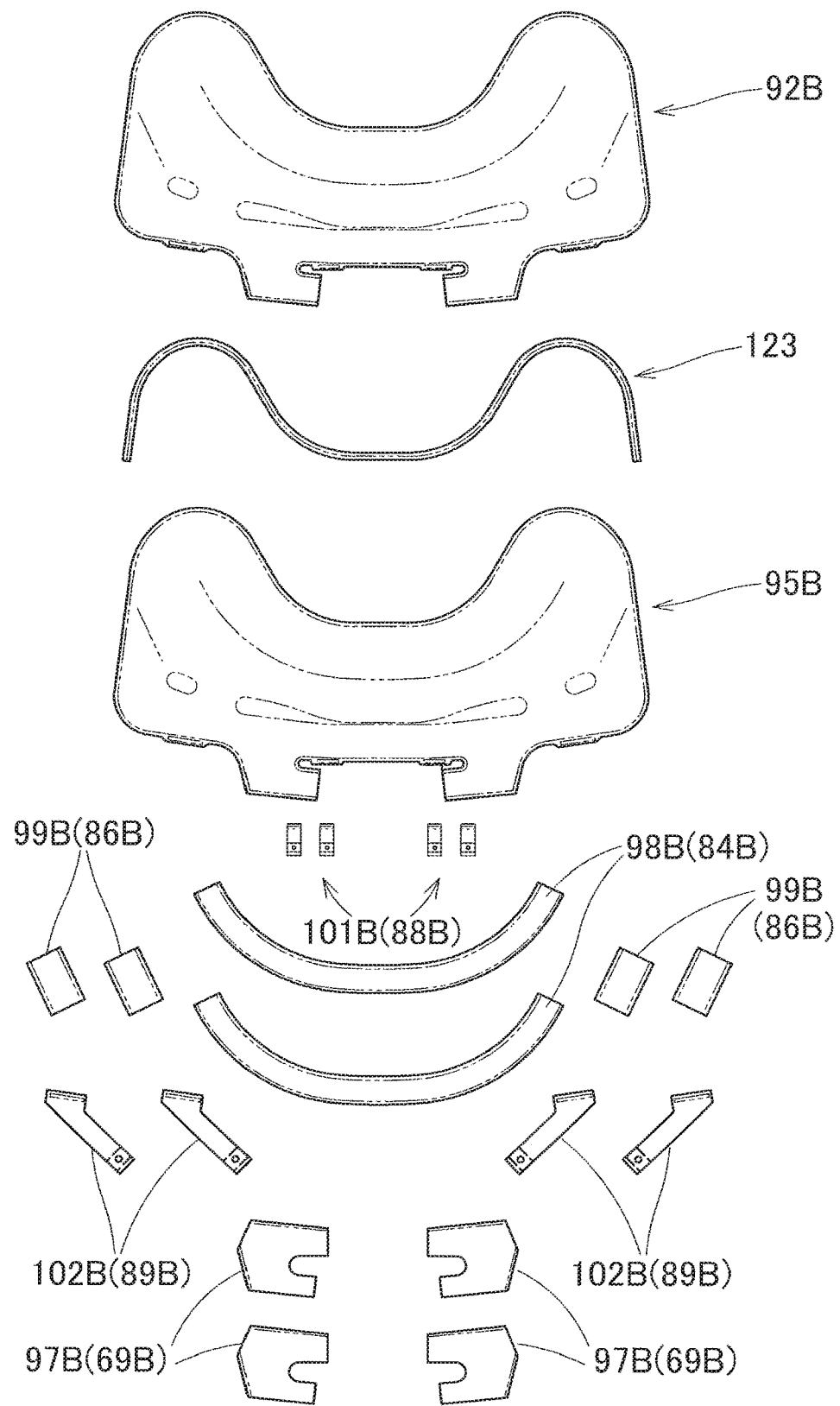
FIG. 18 illustrates materials (base cloths) of the airbag of FIG. 16 in plan views.

The base member 123 is composed of a sheet material having flexibility. The base member 123 of this embodiment is formed of the same material as the base cloths of the airbag 60, 60B, i.e. a woven fabric of polyester yarns, polyamide yarns or the like, coated with a coating agent of silicone resin for preventing gas leakage. As shown in FIG. 18, the base member 123 has such a band-shaped outer contour as to curve correspondingly to the non-adhered joint region 122 (i.e. along the rear region of the outer circumferential edges 64a and 63a of the pedestrian-side wall 64B and the vehicle-side wall 63B). The base member 123 is so disposed that the coated surface faces towards the pedestrian-side wall 64B, and the non-adhesive sealing member 124 is adhered to the coated surface facing towards the pedestrian-side all 64B.

The non-adhesive sealing member 124 is formed by applying a sealing agent to the base member 123 and solidifying it such that the outer surface of the non-adhesive sealing member 124 except the surface adhered to the base member 123 serves as a non-adhesive surface 124a. In this embodiment, the non-adhesive surface 124a is pressed against the pedestrian-side wall 64B.

The sewn seam 125 is formed to go through the non-adhesive sealing member 124. The sewn seam 125 is continuously formed over an entire area of the non-adhered joint region 122 by running the sewing threads T through the pedestrian-side wall 64B and vehicle-side wall 63B including the base member 123 and non-adhesive sealing member 124 disposed there between.

Figure 19:
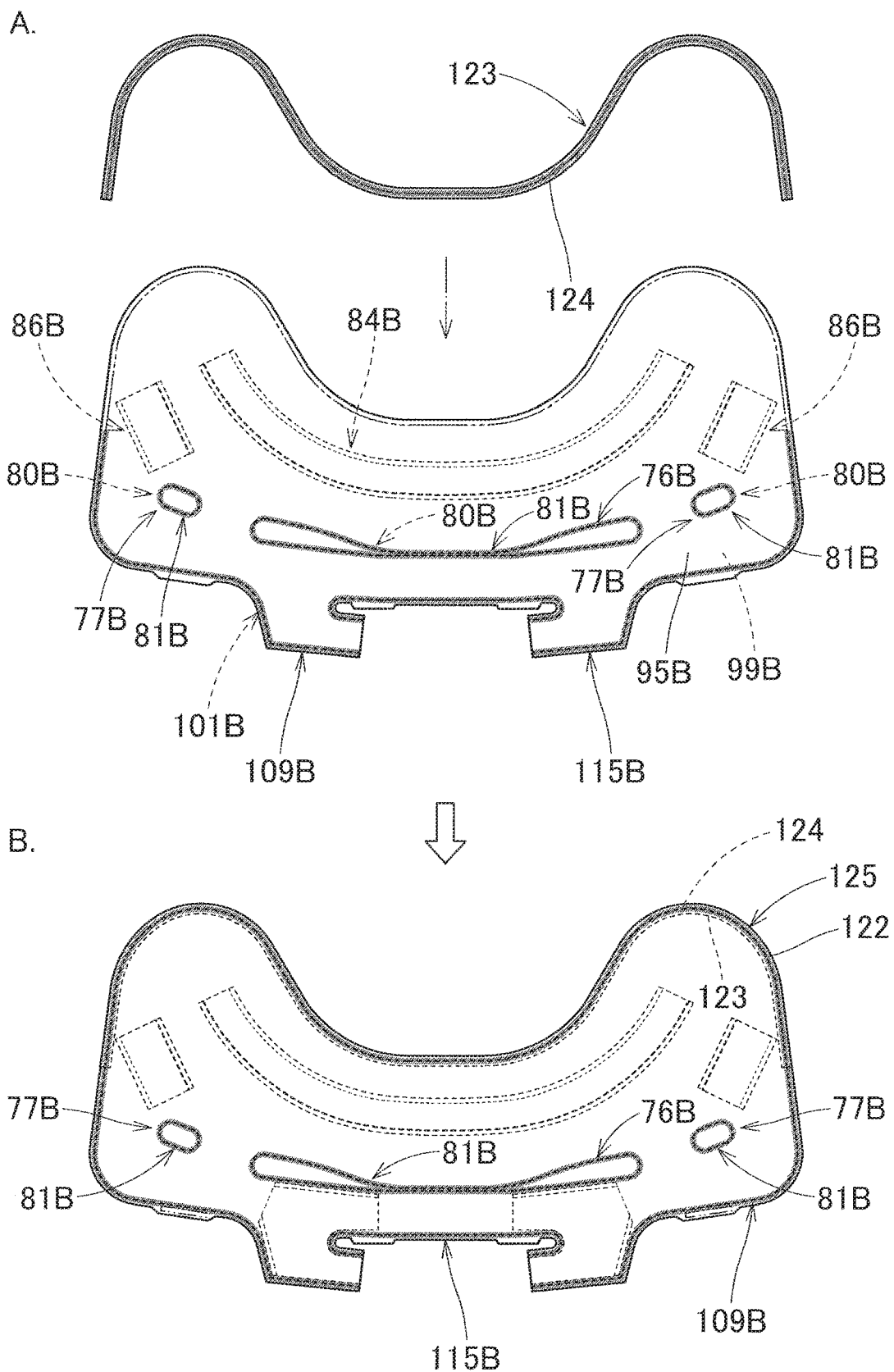
FIG. 19 is a diagram illustrating a production process of the airbag of FIG. 16.

The airbag 60B configured as described above is produced in a similar fashion to the airbag 60. Specifically, as shown in A. and B. of FIG. 19, an adhered joint region 109B, a center thickness regulating section 76B and side thickness regulating sections 77B are firstly formed on the pedestrian-side wall 64B and vehicle-side wall 63B, and a center tether 84B and side tethers 86B are mounted on the pedestrian-side wall 64B and vehicle-side wall 63B. Then the base member 123 and non-adhesive sealing member 124 are inserted in between the pedestrian-side wall 64B and vehicle-side wall 63B, and the outer circumferential edges 64a and 63a of the pedestrian-side wall 64B and the vehicle-side wall 63B are sewn together by running the sewing threads T through the application area of the adhered sealing member 110B in a state that the non-adhesive surface 124a of the non-adhesive sealing member 124 is pressed against the pedestrian-side wall 64B. Thus the sewn seam 125 is formed, as well as the non-adhered joint region 122.

With the airbag 60B configured as described above, the non-adhered joint region 122 can be formed by providing the non-adhesive sealing member 124 in advance, mounting the center tether 84B and side tethers 86B, and then sewing up the outer circumferential edges 63a and 64a of the pedestrian-side wall 64B and vehicle-side wall 63B with the non-adhesive sealing member 124 interposed there between. Moreover, in the airbag 60B configured as described above, although not adhered to the vehicle-side wall 63B or pedestrian-side wall 64B, the non-adhesive sealing member 124 of the non-adhered joint region 122 is pressed against the pedestrian-side wall 64B by the non-adhesive surface 124a. With this configuration, in the pedestrian-side wall 64B, the non-adhesive sealing member 124 is pressed against and thus stops the holes which are formed on the pedestrian-side wall 64B by penetration of the sewing threads T (i.e. gaps H4 formed between the pedestrian-side wall 64B and sewing threads T), thereby preventing a gas leakage from the gaps H4. Therefore, a gas leakage from the non-adhered joint region 122 at airbag deployment will be prevented.

With the airbag 60B configured as described above, the non-adhered joint region 122 can be easily formed by placing the non-adhesive sealing member 124, which has been formed on the base member 123 in advance, between the pedestrian-side wall 64B and vehicle-side wall 63B, and sewing the walls 64B and 63B together. Therefore, the configuration of the airbag 60B will improve the work efficiency in production of the airbag, in comparison with an instance where a sealing member is applied to the vehicle-side wall 63 and solidified, and the pedestrian-side wall 64 and vehicle-side wall 63 are sewn together after solidification of the sealing member, as in the airbag 60 described above.

Although the airbag 60/60B of the embodiments includes the adhered joint region 109/109B, the airbag may be configured with the non-adhered joint region 115, 115A or 122 only, over the entire outer circumferential edge, with no adhered joint region.

The above embodiments have been described as the invention is applied to an airbag for use in an airbag device for pedestrian protection. However, the application of the invention should not be limited thereby. The invention may also be applied to an airbag of a knee-protecting airbag device or an airbag of a side airbag device which is usually provided with a tether inside.

DESCRIPTION OF REFERENCE NUMERALS 60, 60B . . . airbag,
63, 63B . . . vehicle-side wall (adhesion wall),
63a . . . outer circumferential edge,
63b . . . extended region,
64, 64B . . . pedestrian-side wall (non-adhered wall),
64a . . . outer circumferential edge,
84, 84A . . . center tether,
86, 86A (86L, 86R) . . . side tether,
92 . . . vehicle-side base cloth,
93 . . . extended region,
95 . . . pedestrian-side base cloth,
105 . . . joint region,
106 . . . sealing member,
107 . . . sewn seam,
109, 109B . . . adhered joint region,
110, 110B . . . adhered sealing member,
111, 111B . . . sewn seam,
115, 115A . . . non-adhered joint region,
116, 116A . . . non-adhesive sealing member,
116a . . . non-adhesive surface,
117 . . . second sealing member,
117a . . . non-adhesive surface,
118 . . . sewn seam,
122 . . . non-adhered joint region,
123 . . . base member
124 . . . non-adhesive sealing member,
124a . . . non-adhesive surface,
125 . . . sewn seam, and
T . . . sewing thread.

The invention claimed is:

1. An airbag which is inflatable with an inflation gas by separating a pair of opposing walls, wherein:
the airbag includes a joint region of outer circumferential edges of the pair of walls;
the joint region includes, between the outer circumferential edges of the pair of walls, a sealing member which has elasticity, and has adhesiveness in an unsolidified state;
the joint region is formed by such a sewing that runs a sewing thread through an application area of the sealing member;
the sealing member is formed into a line a width of which is greater than that of the sewing thread; and
the joint region includes a region in which the sealing member has a solidified, thus non-adhesive surface, and is pressed against at least one of the walls by the non-adhesive surface, and penetrated by the sewing thread in that state.

2. The airbag of claim 1, further comprising a tether that connects the pair of walls to limit a clearance between the walls at airbag deployment.

3. The airbag of claim 2, wherein the sealing member of the joint region having the non-adhesive surface is adhered to the other of the pair of walls.

4. The airbag of claim 3, wherein:
an adhesion wall, which is the other of the pair of walls to which the sealing member is adhered, includes an extended region that is disposed on an outside of the sealing member, and a second sealing member is adhered to the extended region;
an outer circumferential edge of a non-adhered wall, which is the one of the pair of walls which the non-adhesive surface of the sealing member is pressed against, is sandwiched between an application area of the sealing member on the adhesion wall and the extended region on which the second sealing member is disposed, in a state that the non-adhesive surface of the sealing member and a non-adhesive surface of the second sealing member are pressed against the outer circumferential edge of the non-adhered wall; and
the outer circumferential edge of the non-adhered wall is joined to the adhesion wall by sewing running through the sealing member and second sealing member.

5. The airbag of claim 2, wherein the sealing member having the non-adhesive surface is adhered to a flexible base member that corresponds in contour to the joint region of the outer circumferential edges of the pair of walls, and is penetrated by the sewing thread between the outer circumferential edges of the pair of walls, together with the base member.

6. The airbag of claim 1, wherein the joint region includes:
a non-adhered joint region that includes the sealing member which is pressed against the one of the pair of walls by the non-adhesive surface; and
an adhered joint region that includes a region in which the sealing member is adhered to the outer circumferential edges of both of the pair of walls and the outer circumferential edges of the walls are joined by sewing with the sewing thread.

7. A method of production of an airbag which is inflatable with an inflation gas by separating a pair of opposing walls,
wherein the airbag includes a joint region of outer circumferential edges of the pair of walls;
wherein the joint region includes, between the outer circumferential edges of the pair of walls, a sealing member which has elasticity, and has adhesiveness in an unsolidified state;
wherein the joint region is formed by such a sewing that runs a sewing thread through an application area of the sealing member;
wherein the sealing member is formed into a line a width of which is greater than that of the sewing thread; and
wherein the joint region includes a region in which the sealing member has a solidified, thus non-adhesive surface, and is pressed against at least one of the pair of walls by the non-adhesive surface, and penetrated by the sewing thread in that state, the method of production comprising:
applying a sealing agent to the other of the pair of walls and solidifying the sealing agent so as to form the sealing member provided with the non-adhesive surface, and forming the joint region in which the non-adhesive surface of the sealing member is pressed against the one of the pair of walls, by sewing the outer circumferential edges of the pair of walls together by running the sewing thread through the application area of the sealing member in a state that the non-adhesive surface of the sealing member is pressed against the one of the pair of walls.

8. The method of production of claim 7, further comprising a mounting of a tether that connects the pair of walls to limit a clearance between the pair of walls at airbag deployment, after forming the sealing member and before forming the joint region.

9. The method of production of claim 8, further comprising:
in an adhesion wall, which is the other of the pair of walls to which the sealing member is adhered, providing an extended region on an outside of the sealing member, and adhering a second sealing member to the extended region;
sandwiching an outer circumferential edge of a non-adhered wall, which is the one of the pair of walls which the non-adhesive surface of the sealing member is pressed against, between an application area of the sealing member on the adhesion wall and the extended region on which the second sealing member is disposed, such that the non-adhesive surface of the sealing member and a non-adhesive surface of the second sealing member are pressed against the outer circumferential edge of the non-adhered wall; and
forming the joint region in which the non-adhesive surface of the sealing member and the non-adhesive surface of the second sealing member are pressed against the non-adhered wall by sewing the outer circumferential edges of the pair of walls together by running the sewing thread through the sealing member and second sealing member.

10. The method of production of claim 7, wherein:
the joint region includes:
a non-adhered joint region that includes the sealing member which is pressed against the one of the pair of walls by the non-adhesive surface; and
an adhered joint region that includes a region in which the sealing member is adhered to the outer circumferential edges of both of the pair of walls and the outer circumferential edges of the walls are joined by sewing with the sewing thread; and
the adhered joint region is formed by adhering the outer circumferential edges of the pair of walls together before connecting the tether to the pair of walls.

11. A method of production of an airbag which is inflatable with an inflation gas by separating a pair of opposing walls,
wherein the airbag includes a joint region of outer circumferential edges of the pair of walls;
wherein the joint region includes, between the outer circumferential edges of the pair of walls, a sealing member which has elasticity, and has adhesiveness in an unsolidified state;
wherein the joint region is formed by such a sewing that runs a sewing thread through an application area of the sealing member;
wherein the sealing member of the joint region is formed into a line a width of which is greater than that of the sewing thread;
wherein the joint region includes a region in which the sealing member has a solidified, thus non-adhesive surface, and is pressed against at least one of the pair of walls by the non-adhesive surface, and penetrated by the sewing thread in that state; and
wherein the sealing member is composed of a sealing agent that has been applied to a flexible base member that corresponds in contour to the joint region of the outer circumferential edges of the pair of walls, then solidified, such that the sealing member is provided with the non-adhesive surface,
the method of production comprising:
placing the sealing member between the pair of walls; and
forming the joint region in which the non-adhesive surface of the sealing member is pressed against the one of the pair of walls by pressing the non-adhesive surface of the sealing member against the one of the pair of walls and sewing the outer circumferential edges of the pair of walls together by running the sewing thread through the application area of the sealing member.

12. The method of production of claim 11, further comprising a mounting of a tether that connects the pair of walls to limit a clearance between the pair of walls at airbag deployment, before forming the joint region.

* * * * *